US010051957B2

(12) United States Patent
Lipper McCauley

(10) Patent No.: US 10,051,957 B2
(45) Date of Patent: Aug. 21, 2018

(54) ROLLABLE DRAWER SYSTEM

(71) Applicant: Lipper International, Inc., Wallingford, CT (US)

(72) Inventor: Amy Lipper McCauley, Wallingford, CT (US)

(73) Assignee: Lipper International, Inc., Wallingford, CT (US)

( * ) Notice: Subject to any disclaimer, the term of this patent is extended or adjusted under 35 U.S.C. 154(b) by 322 days.

(21) Appl. No.: 14/989,399

(22) Filed: Jan. 6, 2016

(65) Prior Publication Data

US 2017/0188704 A1 Jul. 6, 2017

(51) Int. Cl.
*A47B 37/00* (2006.01)
*B60B 33/06* (2006.01)
(Continued)

(52) U.S. Cl.
CPC .............. *A47B 37/00* (2013.01); *A47B 46/00* (2013.01); *A47B 88/40* (2017.01); *A47B 88/90* (2017.01);
(Continued)

(58) Field of Classification Search
CPC .............. Y10T 16/193; Y10T 16/1937; Y10T 16/1943; B60B 33/04; B60B 33/06; B60B 33/066; A61G 7/1046; A61G 7/1048; A47J 47/00; A47J 47/16; A47J 36/34; A47J 2043/04454; A47B 37/00; A47B 2210/17; A47B 88/90; A47B 46/00; A47B 77/18;
(Continued)

(56) References Cited

U.S. PATENT DOCUMENTS 145,011 A * 11/1873 Proctor ................... B60B 33/06
280/43.14
343,511 A 6/1886 White
(Continued)

FOREIGN PATENT DOCUMENTS

DE 3406581 A1 * 8/1985 ............. A47B 21/00
DE 3406581 A1 8/1985
(Continued)

OTHER PUBLICATIONS

European Search Report from corresponding European Application No. EP 17000002.
(Continued)

*Primary Examiner* — Andrew Mark Roersma
(74) *Attorney, Agent, or Firm* — Lucas & Mercanti, LLP

(57) ABSTRACT

An apparatus includes a housing having first and second sides, a bottom surface, and a drawer disposed in the housing. Each of the first and second sides of the housing includes first and second wheels coupled to the housing, the first and second wheels having a first wheel position in which no portion of the first and second wheels is above the bottom surface of the housing and a second wheel position in which a portion of each of the first and second wheels is below the bottom surface of the housing. Each side also includes an arm coupled to the housing, the arm having a first arm position and a second arm position, wherein movement of the arm from the first arm position to the second arm position causes the first and second wheels to move from the first wheel position to the second wheel position.

13 Claims, 27 Drawing Sheets

(51) Int. Cl.
 A47B 46/00 (2006.01)
 A47B 95/02 (2006.01)
 A47J 47/00 (2006.01)
 A47J 47/16 (2006.01)
 F16M 11/42 (2006.01)
 A47B 88/40 (2017.01)
 A47B 88/90 (2017.01)
 F16M 11/04 (2006.01)
 A47J 36/34 (2006.01)
 A47J 43/044 (2006.01)

(52) U.S. Cl.
 CPC .............. *A47B 95/02* (2013.01); *A47J 47/00* (2013.01); *A47J 47/16* (2013.01); *B60B 33/066* (2013.01); *F16M 11/046* (2013.01); *F16M 11/42* (2013.01); *A47B 2095/026* (2013.01); *A47B 2200/0038* (2013.01); *A47B 2210/17* (2013.01); *A47J 36/34* (2013.01); *A47J 2043/04454* (2013.01)

(58) Field of Classification Search
 CPC .............. A47B 91/02; A47B 2025/006; A47B 2200/0038; F16M 11/046; F16M 11/42
 See application file for complete search history.

(56) References Cited

U.S. PATENT DOCUMENTS

| | | | | |
|---|---|---|---|---|
| 935,289 | A | * | 9/1909 | Wood ...................... B60B 33/06 16/34 |
| 1,426,328 | A | | 8/1922 | Tiffany |
| 2,042,489 | A | * | 6/1936 | Williams ................ B60B 33/06 16/33 |
| 2,192,337 | A | * | 3/1940 | Tiffany .................. B60B 33/06 108/80 |
| 2,624,590 | A | * | 1/1953 | Tilton ...................... B25H 5/00 182/17 |
| 2,783,055 | A | | 2/1957 | Michaud |
| 2,841,410 | A | * | 7/1958 | Kessler, Jr. ............. B60B 33/06 280/43.15 |
| 2,843,392 | A | * | 7/1958 | Simpkins ................ B60B 33/06 280/43.14 |
| 2,878,029 | A | | 3/1959 | Dahmen et al. |
| 2,993,740 | A | * | 7/1961 | Good ....................... A47B 1/04 108/19 |
| 3,663,982 | A | * | 5/1972 | Hayden ................... B05C 21/00 15/248.2 |
| 3,782,750 | A | | 1/1974 | Peters |
| 4,378,191 | A | * | 3/1983 | Sato ........................ B60P 1/027 254/2 C |
| 4,892,302 | A | * | 1/1990 | Daigle ..................... A63B 5/00 473/440 |
| 5,449,266 | A | * | 9/1995 | Evans .................... B62B 3/0631 254/10 C |
| 6,276,423 | B1 | * | 8/2001 | Goracy ................... B60C 25/02 157/1.17 |
| D560,090 | S | | 1/2008 | Chung |
| D628,444 | S | | 12/2010 | Snider |
| D628,445 | S | | 12/2010 | Snider |
| D644,491 | S | | 9/2011 | Snider |
| D659,481 | S | | 5/2012 | Tiemann |
| D660,088 | S | | 5/2012 | Tiemann |
| D661,951 | S | | 6/2012 | Tiemann |
| D665,230 | S | | 8/2012 | Snider |
| D674,213 | S | | 1/2013 | Hertaus |
| D675,849 | S | | 2/2013 | Tawil |
| D676,265 | S | | 2/2013 | Tawil |
| D676,715 | S | | 2/2013 | Tsai |
| D679,954 | S | | 4/2013 | Snider |
| D680,380 | S | | 4/2013 | Tiemann |
| D682,039 | S | | 5/2013 | Tiemann |
| D684,404 | S | | 6/2013 | Hertaus |
| D686,464 | S | | 7/2013 | Tiemann |
| D697,744 | S | | 1/2014 | Lipper McCauley |
| 8,641,060 | B2 | * | 2/2014 | Starr ...................... A47J 47/16 211/133.6 |
| 8,657,306 | B2 | | 2/2014 | Chiu |
| D701,431 | S | | 3/2014 | Tsai |
| D701,733 | S | | 4/2014 | Tiemann |
| D703,002 | S | | 4/2014 | Tiemann |
| D703,003 | S | | 4/2014 | Tiemann |
| D703,005 | S | | 4/2014 | Tiemann |
| D708,906 | S | | 7/2014 | Tiemann |
| D708,907 | S | | 7/2014 | Tiemann |
| D708,908 | S | | 7/2014 | Tiemann |
| D708,909 | S | | 7/2014 | Tiemann |
| D713,691 | S | | 9/2014 | Sabounjian |
| D713,692 | S | | 9/2014 | Tsai |
| D718,578 | S | | 12/2014 | Sabounjian |
| D722,831 | S | | 2/2015 | Tuang |
| 8,974,014 | B1 | | 3/2015 | Tiemann et al. |
| D734,101 | S | | 7/2015 | Greenspon |
| D743,748 | S | | 11/2015 | Tiemann et al. |
| D750,442 | S | | 3/2016 | Tiemann et al. |
| D755,574 | S | | 5/2016 | Lee |
| D764,236 | S | | 8/2016 | Hertaus |
| D778,647 | S | | 2/2017 | Snider |
| D782,868 | S | | 4/2017 | Lien |
| D784,745 | S | | 4/2017 | Nilsson et al. |
| 2005/0258327 | A1 | * | 11/2005 | Chen .................... A47B 91/005 248/346.01 |
| 2012/0024329 | A1 | | 2/2012 | Ma |
| 2014/0091695 | A1 | | 4/2014 | Sabounjian |
| 2014/0097120 | A1 | | 4/2014 | Sabounjian |
| 2014/0183322 | A1 | | 7/2014 | Starr et al. |
| 2014/0217876 | A1 | | 8/2014 | Tsai |

FOREIGN PATENT DOCUMENTS

| | | | | |
|---|---|---|---|---|
| EP | 0207843 | A1 | | 1/1987 |
| FR | 2604426 | A1 * | 4/1988 | ............ B60B 33/06 |
| GB | 624303 | A * | 6/1949 | ............ B60B 33/06 |
| JP | 60244601 | A * | 12/1985 | ............ B60B 33/06 |

OTHER PUBLICATIONS

Extended European Search Report which includes the Examiner's Opinion based on European Search Report.

* cited by examiner

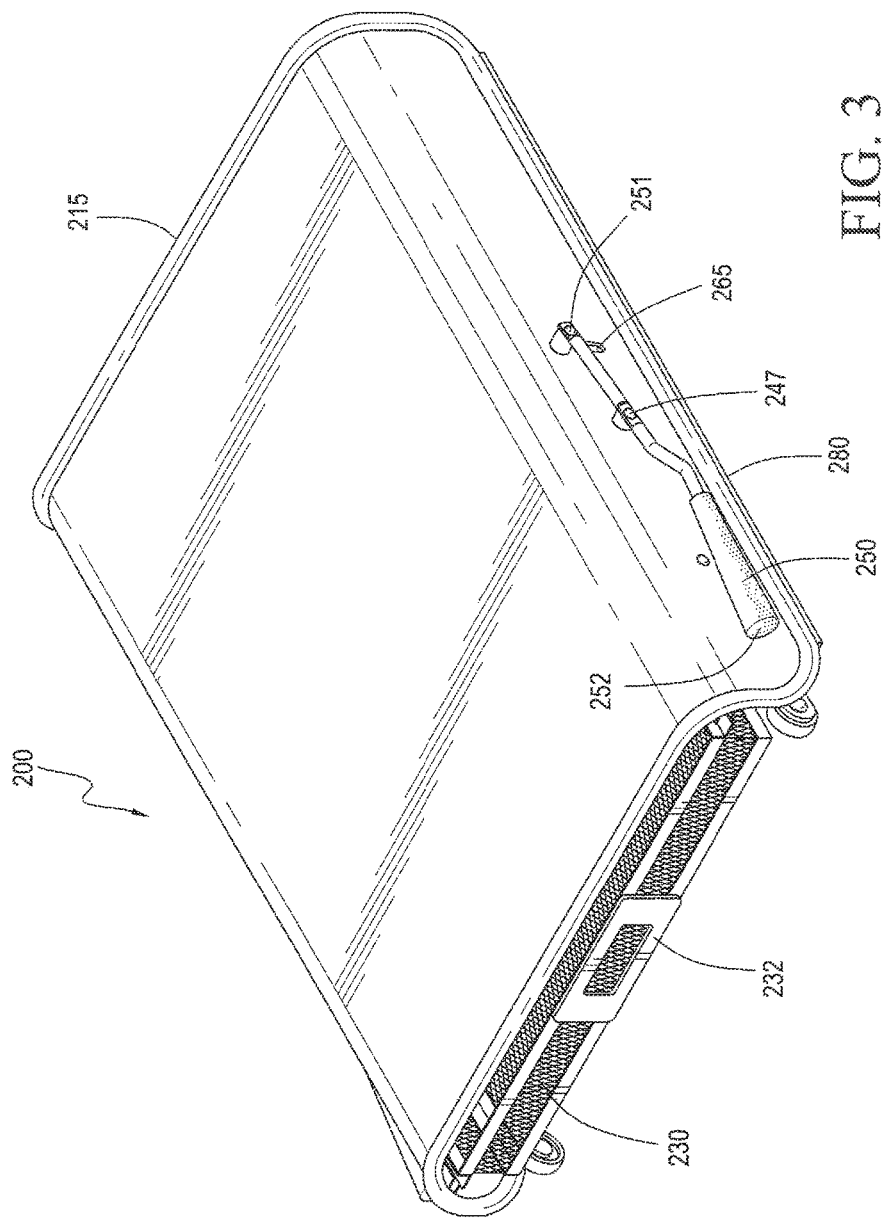

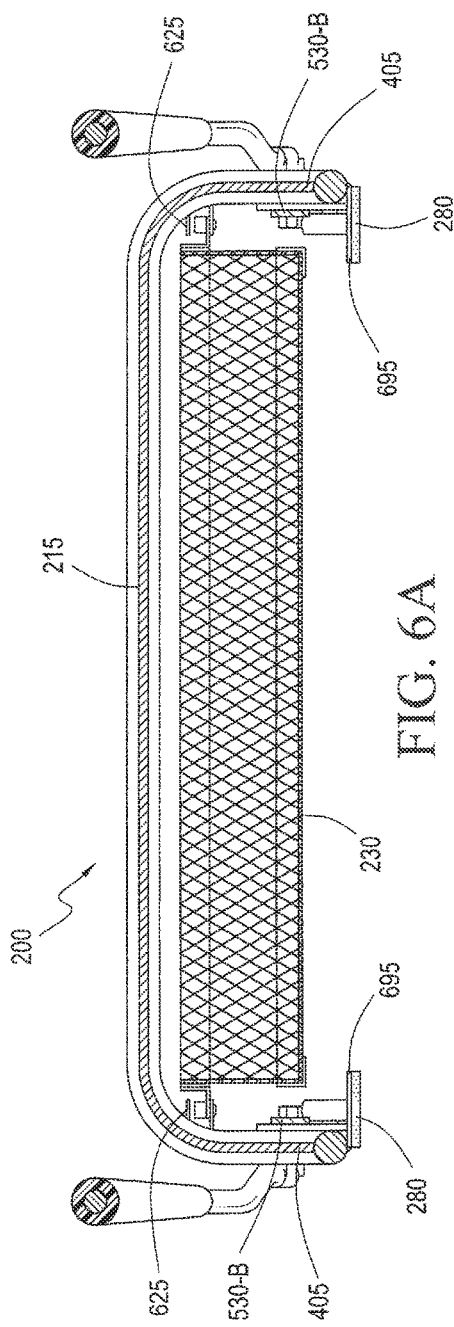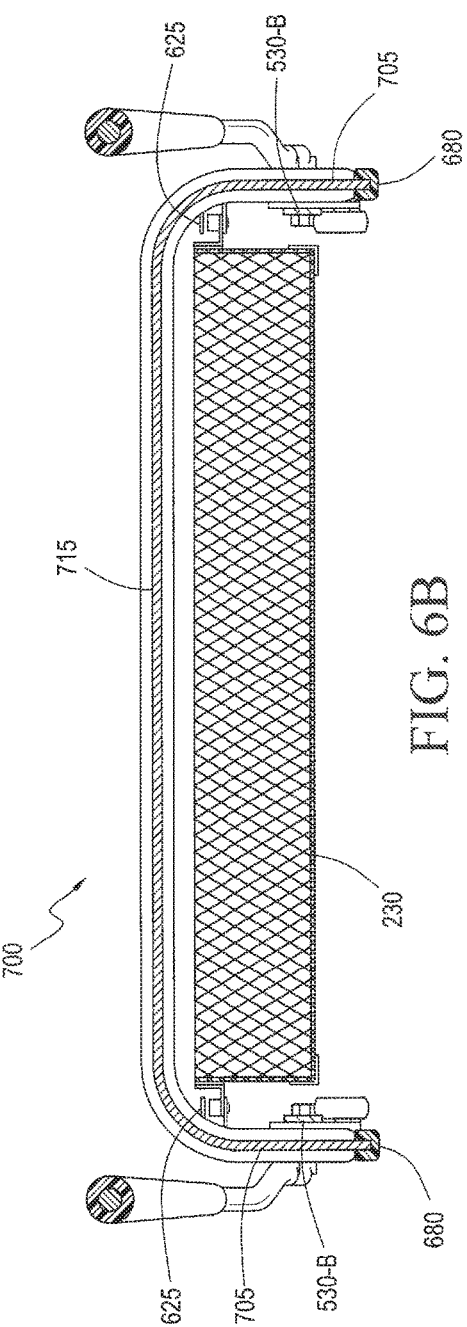

ROLLABLE DRAWER SYSTEM

TECHNICAL FIELD

This specification relates generally to household furniture and appliances, and more particularly to rollable drawer systems.

BACKGROUND

Drawers are available in many different shapes and sizes. Recently, single-drawer systems have been used in connection with mixing machines and food processors, which are increasingly popular items in homes, offices, and elsewhere. Mixing machines and food processors allow a user to prepare a recipe from selected ingredients quickly and easily.

Many users of a mixing machine or food processor also use a specially-designed countertop drawer designed to hold tools required for the device, such as spoons, whisks, and beaters. In many homes, the mixing machine or food processor is stacked on top of the drawer and stored on a countertop in the kitchen.

SUMMARY

In accordance with an embodiment, an apparatus includes a housing having first and second sides and a bottom surface, and a drawer disposed in the housing. Each of the first and second sides of the housing includes first and second wheels coupled to the housing, the first and second wheels having a first wheel position in which no portion of the first and second wheels is below the bottom surface of the housing and a second wheel position in which a portion of each of the first and second wheels is below the bottom surface of the housing. Each side also includes an arm coupled to the housing, the arm having a first arm position and a second arm position, wherein movement of the arm from the first arm position to the second arm position causes the first and second wheels to move from the first wheel position to the second wheel position.

In one embodiment, each of the first and second sides of the housing further includes a side wall, and a slot defined in the side wall. A portion of the arm is adapted to move between a first location in the slot, the first location being associated with the first arm position, and a second location in the slot, the second location being associated with the second arm position.

In another embodiment, each of the first and second sides further includes a pivot, wherein the arm is fixed on the pivot. The arm pivots on the pivot from the first arm position to the second arm position.

In another embodiment, each of the first and second sides of the housing further includes a first lever coupled to the arm via the slot, a first wheel coupled to the first lever, a second lever coupled to the arm via the slot, and a second wheel coupled to the first lever. Movement of the arm from the first arm position to the second arm position causes the first and second levers to move from a first lever position to a second lever position, thereby causing the first and second wheels to move from the first wheel position to the second wheel position.

In another embodiment, the first lever and the second lever are coupled to the arm by a friction-generating element that is engaged in the slot.

In another embodiment, the arm is disposed on an exterior of the sidewall, and the first and second levers and the first and second wheels are disposed on an interior of the side wall.

In another embodiment, each of the first and second sides of the housing further includes a pad coupled to the side wall. An edge of the pad defines the bottom surface of the housing.

In another embodiment, each of the first and second sides further includes a flange attached to the side wall. The pad is attached to the flange.

In another embodiment, the pad includes one of a plastic material, a foam material, and a cloth material.

In another embodiment, the first and second sides define an opening at a front of the housing, and the drawer is adapted to slide from a first drawer position to a second drawer position through the opening.

In accordance with another embodiment, a rollable drawer system includes a housing that includes a top, and first and second sides, wherein each side includes a wall having an interior, an exterior, and a lower edge. Each side also includes a pair of wheels coupled to the respective wall on the interior of the wall, the pair of wheels having a first wheel position in which the pair of wheels are higher than the lower edge of the respective wall, and a second wheel position in which the pair of wheels are lower than the lower edge of the respective wall. Each side also has an arm coupled to the respective wall on the exterior of the wall, the arm having a first arm position and a second arm position, wherein a movement of the arm from the first position to the second position causes the pair of wheels to move from the first wheel position to the second wheel position. The first and second sides define an opening. A drawer is disposed in the housing, the drawer being adapted to move through the opening of the housing, the drawer having a closed position in which the drawer is fully in the housing and a closed position in which the drawer is removed at least partially from the housing through the opening. The rollable drawer system cannot roll on a surface when a first pair of wheels coupled to the first side are in the first wheel position and a second pair of wheels coupled to the second side are in the first wheel position. The rollable drawer system is adapted to roll on the surface when the first pair of wheels coupled to the first side are in the second wheel position and the second pair of wheels coupled to the second side are in the second wheel position.

In one embodiment, the wall includes a slot, and the arm is engaged in the slot, the arm being adapted to move within the slot, the first position being associated with a first location in the slot and the second position being associated with a second location in the slot.

In another embodiment, each side further includes first and second levers engaged in the slot, wherein a respective first wheel is coupled to the first lever and a respective second wheel is coupled to the second lever. The first and second levers are coupled to the arm, and movement of the arm from the first position to the second position causes the first and second levers to move from a first lever position to a second lever position, wherein movement of the first and second levers causes the pair of wheels to move from the first wheel position to the second wheel position.

In another embodiment, each side further includes a friction-generating element engaged in the slot, wherein the first and second levers are coupled to the friction-generating element, and the arm is also coupled to the friction-generating element.

In another embodiment, each side of the housing further includes a pad having a lower surface, wherein the respective pair of wheels is above the lower surface of the pad when the pair of wheels are in the first wheel position and the pair of wheels are below the lower surface of the pad when the pair of wheels are in the second wheel position.

In another embodiment, the pad includes one of a plastic material, a foam material, and a cloth material.

These and other advantages of the present disclosure will be apparent to those of ordinary skill in the art by reference to the following Detailed Description and the accompanying drawings.

BRIEF DESCRIPTION OF THE DRAWINGS

FIGS. 2A, 2B and 3 show a rollable drawer system in accordance with an embodiment;

FIG. 6A shows a cross-section of a rollable drawer system in accordance with an embodiment;

FIG. 6B shows a cross-section of a rollable drawer system in accordance with another embodiment;

DETAILED DESCRIPTION

Figure 1:
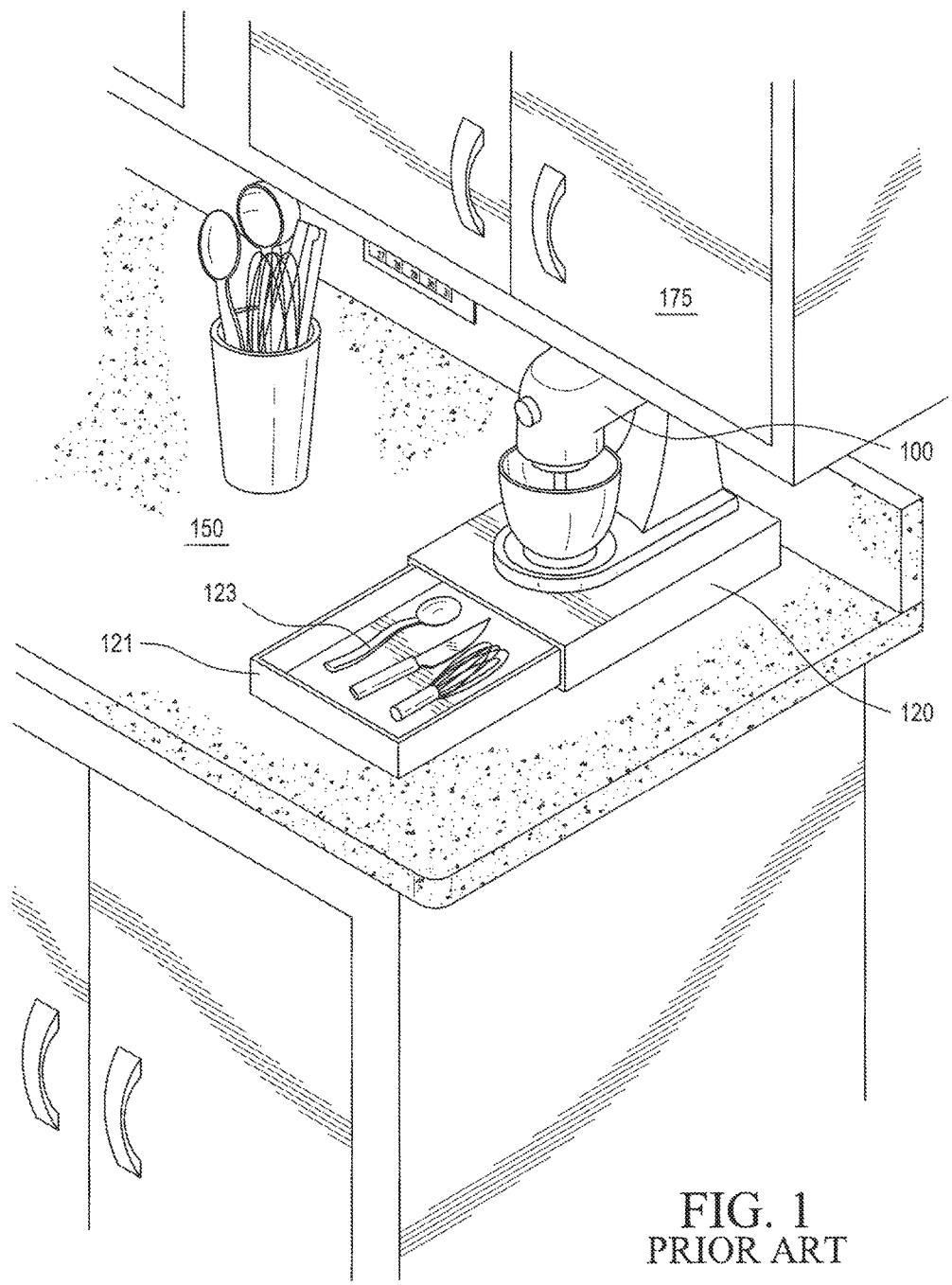
FIG. 1 shows an exemplary mixing machine and a drawer system in a user's kitchen.

Many users of mixing machines, food processors, or other types of devices use a countertop drawer to hold tools required for the device. FIG. 1 shows an exemplary mixing machine 100 in a user's kitchen. Mixing machine 100 sits on a single-drawer system 120 containing a single drawer 121, which sits on a countertop 150. Above countertop 150 and mixing machine 100 is a cabinet 175. In order to use the mixing machine 100, the user may select a tool 123 (such as a spoon, whisk, or beater) stored in drawer 121, and install the tool into mixing machine 100. In many mixing machines, it is necessary to raise an upper portion of the mixing machine in order to install the tool.

It has been observed that in the kitchens of many homes, the space between the countertop (e.g., countertop 150) and the cabinet above (e.g., cabinet 175) provides sufficient space to store a mixing machine stacked on top of a single-drawer system, but is insufficient to allow easy operation of the mixing machine while arranged in a stacked configuration. For example, in an arrangement such as that shown in FIG. 1, when a user attempts to raise a portion of mixing machine 100 in order to install a desired tool, the user may find that the machine 100 is blocked by cabinet 175 and cannot be raised. As a result, in order to use the mixing machine 100, the user may be forced to remove the mixing machine 100 from its stacked position in order to install the desired tool, and then replace the mixing machine on top of the drawer system 120. Such an arrangement is clearly inconvenient.

In accordance with an embodiment, a rollable drawer system is provided. The rollable drawer system has a flat surface on which a mixing machine, food processor, or other device may be placed, and includes a drawer adapted to hold a variety of tools and other items. The rollable drawer system also has wheels that are selectively adjustable between a raised position and a lowered position. When the wheels are lowered, the rollable drawer system may be rolled on a countertop or other surface. When the wheels are raised, the rollable drawer system may not be rolled and remains securely in place on the countertop or other surface. Thus, for example, a user may stack a mixing machine on top of the rollable drawer system and store the two stacked appliances on a countertop (under a cabinet), with the wheels of the rollable drawer system in the raised position. When the user wishes to use the mixing machine, the user may adjust the wheels to the lowered position, and roll the drawer system, and the mixing machine sitting on top thereof, out from under the cabinet. The user may then retract the wheels to the raised position in order to secure the drawer system in place on the countertop. The user may then raise a portion of the mixing machine, as necessary, to install a desired tool, and use the mixing machine. The user may then again lower the wheels and roll the drawer system and mixing machine back to their original location under the cabinet, and adjust the wheels to return them to the raised position. The drawer system and mixing machine are thus returned to their original location for storage until the next time the user wishes to use the mixing machine.

Figure 2A:
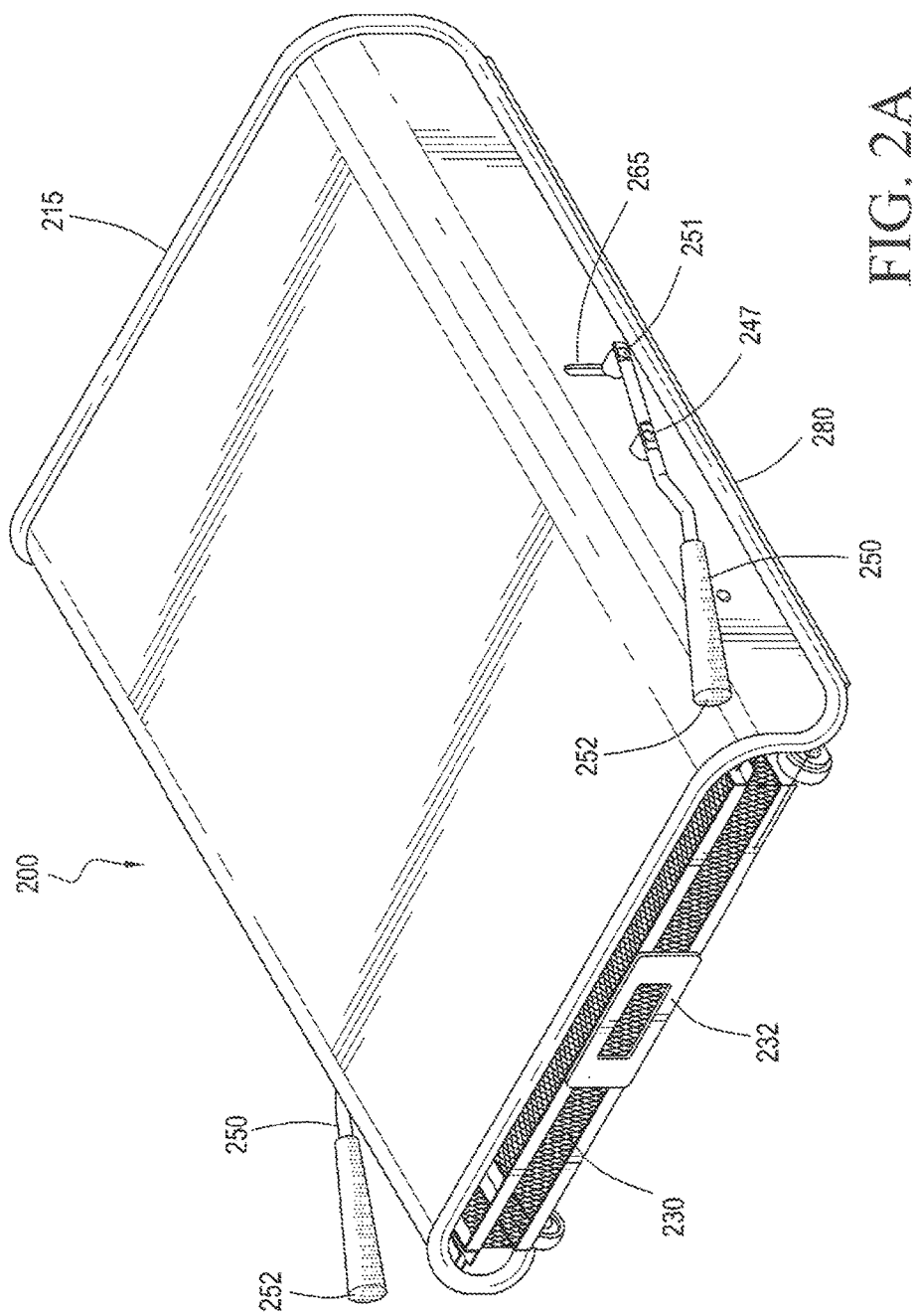

FIG. 2A shows a rollable drawer system in accordance with an embodiment. In particular, FIG. 2A is a perspective view showing the front, top, and one side of a rollable drawer system 200. Rollable drawer system 200 includes a housing 215 and a drawer 230. Drawer 230 includes an opening 232 that may facilitate opening and closing of the drawer 230, in a well-known manner. Two pads (of which one pad 280 is visible in FIG. 2A) are disposed on the underside of housing 215.

Housing 215 includes two sides and a top surface. Only one side of housing 215 is visible in FIG. 2A. The two sides and top of housing 215 define an opening at the front of housing 215. Drawer 230 may slide in and out of the opening at the front of housing 215. Housing 215 may comprise any suitable material such as a metal, a plastic material, etc.

In one embodiment, the two sides of housing 215 define an opening at the back of housing 215, and housing 215 does not include a back side. In one embodiment, drawer 230 may slide in and out through the opening at the back of housing 215. In another embodiment, drawer 230 cannot be withdrawn from the opening at the back of housing 215. In another embodiment, the housing includes a back side that encloses drawer 230.

The two sides of housing 215 include similar features. Each side of housing 215 includes a slot 265. Each side of housing 215 also includes an arm 250 which is fixed to the side of housing 215 at a pivot 247. Arm 250 has a first arm position and a second arm position. Arm 250 pivots on pivot 247 from the first arm position to the second arm position. More particularly, arm 250 has a first end 251 which engages with slot 265 and a second end 252 which may be manipulated by a user to adjust the arm's position. When the user adjusts second end 252, arm 250 pivots around pivot 247, causing first end 251 to move up and down within the respective slot 265.

Figure 2B:
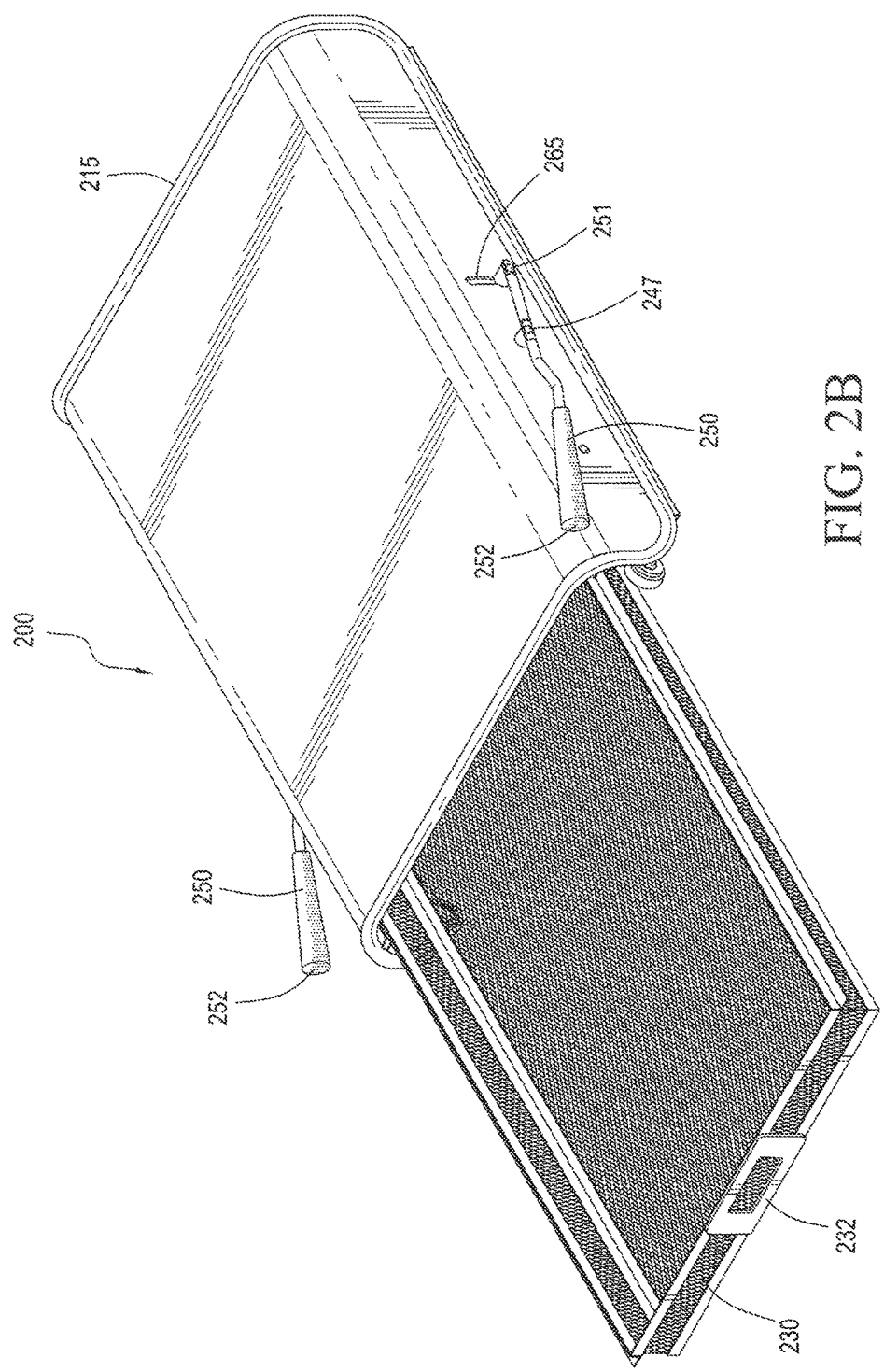

Drawer 230 has a first, closed position, shown in FIG. 2A, in which the drawer is fully inside the housing. Drawer 230 may slide out of housing 215 (e.g., a user may pull the drawer 230 out of housing 215) to a second, open position, in which the drawer is at least partially removed from housing 215. FIG. 2B shows rollable drawer system 200 with drawer 230 in the second, open position.

In FIGS. 2A-2B, arm 250 is shown in a first arm position. FIG. 3 shows rollable drawer system 200 when arm 250 is in a second arm position.

Figure 4A:
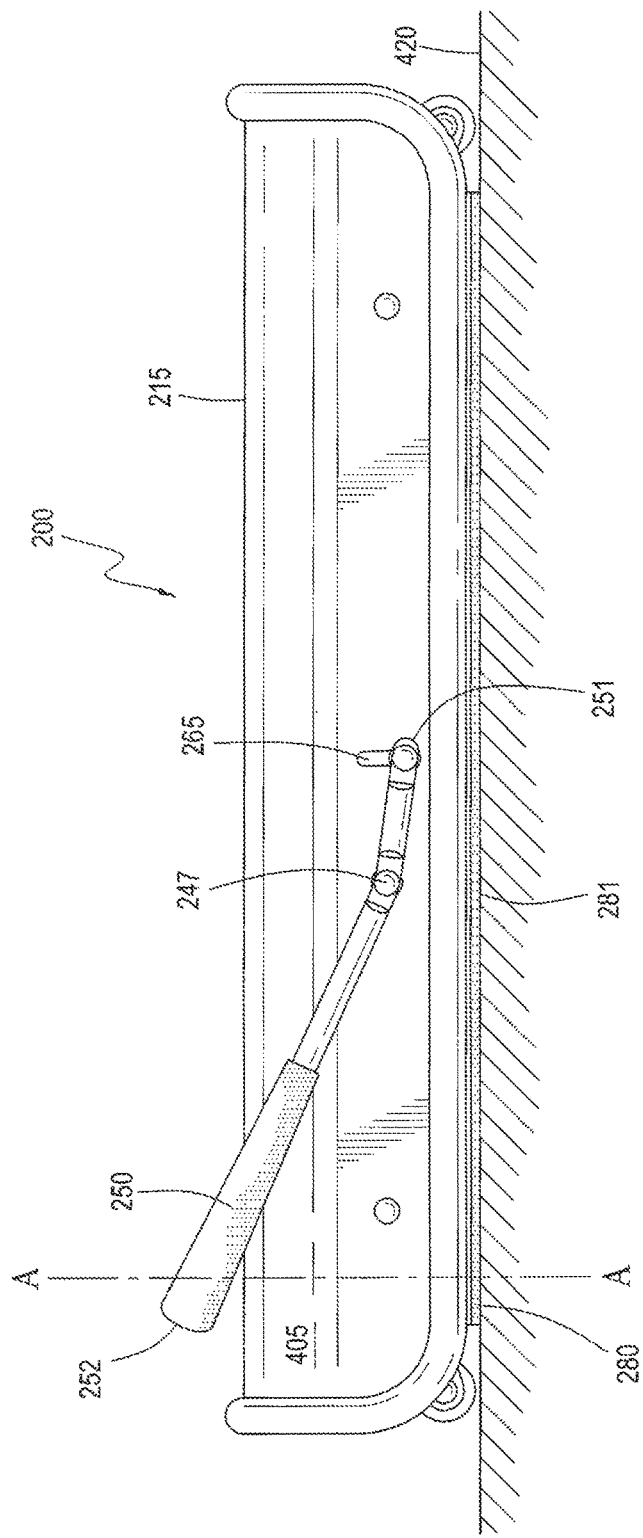
FIGS. 4A-4B show an exterior of a side of a rollable drawer system in accordance with an embodiment.

FIG. 4A shows a side view of rollable drawer system 200 when arm 250 is in the first arm position, which is an "up" position. Specifically, FIG. 4A shows an exterior of a side of rollable drawer system 200. The side of rollable drawer system 200 includes a wall 405 in which slot 265 is defined, and arm 250. Arm 250 pivots on pivot 247. When arm 250 is in the first arm position, as shown in FIG. 4A, rollable drawer system 200 may rest on a surface such as surface 420, which may be a countertop, for example. Specifically, a bottom surface of housing 215 is in contact with surface 420. In the illustrative embodiment, the bottom surface is a lower edge 281 of pad 280, which is in contact with, and rests, on surface 420. A second pad 280 on the opposite side of housing 215 may also rest on surface 420.

Figure 4B:
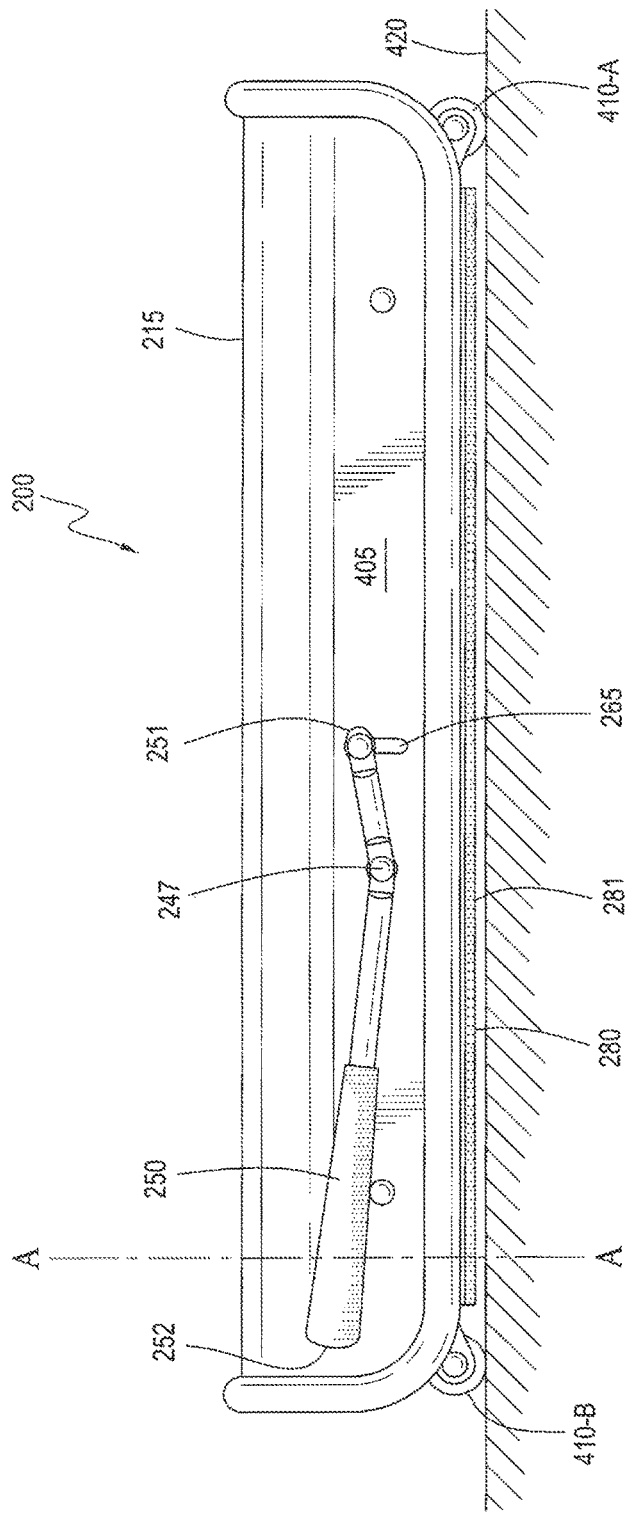

FIG. 4B shows a side view of rollable drawer system 200 when arm 250 is in the second arm position, which is the "down" position. When arm 250 is in the second arm position, as shown in FIG. 4B, rollable drawer system 200 is supported by two wheels 410-A, 410-B. Wheels 410-A, 410-B are in contact with surface 420; now pad 280 is not in contact with surface 420. A second arm on the opposite side of housing may be adjusted in a similar manner to cause a second pair of wheels 410 coupled to the opposite side of housing 215 to be lowered and to make contact with surface 420. When both pairs of wheels 410 are lowered, rollable drawer system 200 may roll on wheels 410.

Figure 5A:
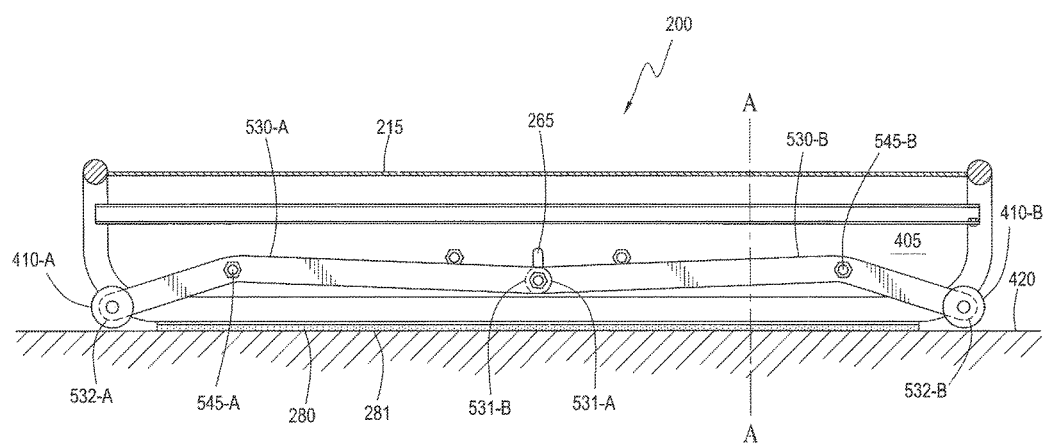
FIGS. 5A-5B show an interior of a side of a rollable drawer system in accordance with an embodiment.
Figure 5B:
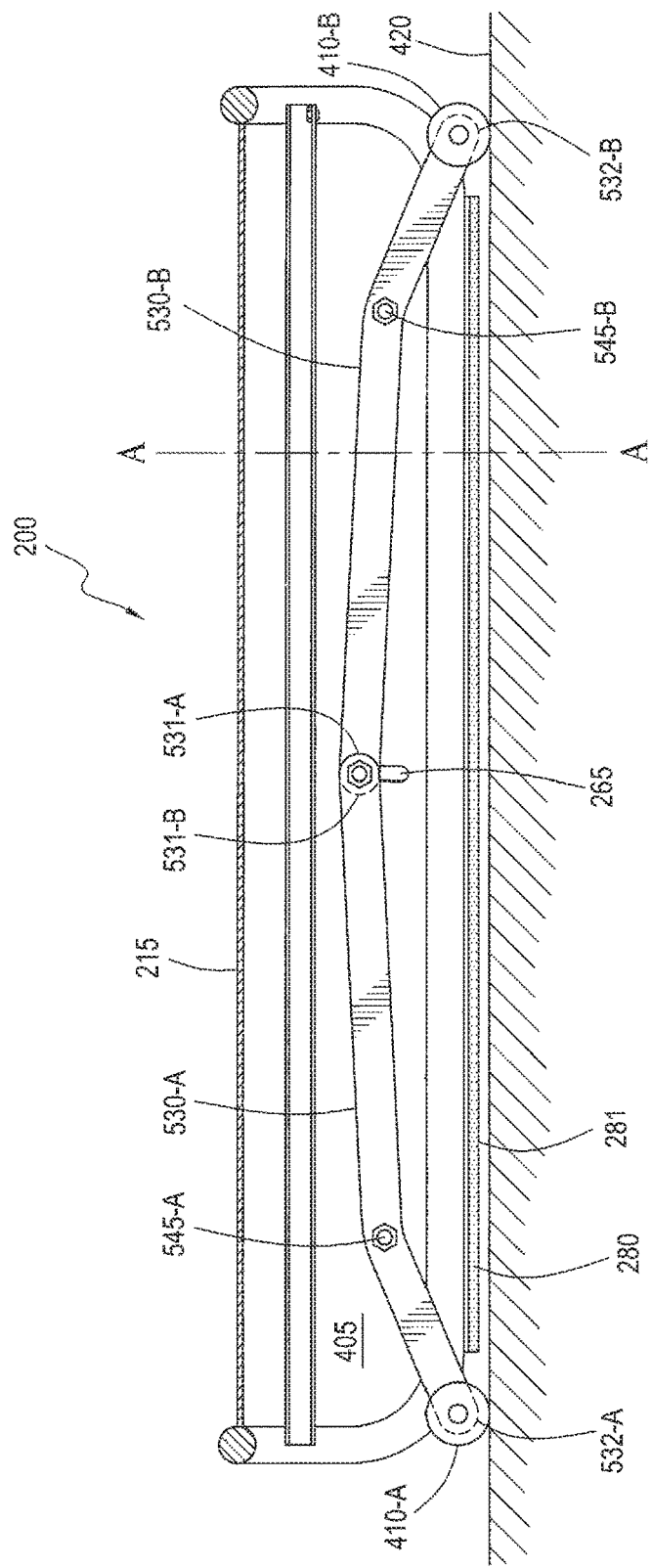

FIGS. 5A-5B show an interior of the side of rollable drawer system 200. The interior of the side includes wall 405, wheels 410-A and 410-B, and levers 530-A and 530-B. Wheels 410-A, 410-B are coupled to first and second levers 530-A, 530-B, respectively. Lever 530-A pivots on a first pivot 545-A and has a first end 531-A that is engaged with slot 265 and a second end 532-A that is coupled to wheel 410-A. Lever 530-B pivots on a second pivot 545-B and has a first end 531-B that is engaged with slot 265 and a second end 532-B that is coupled to wheel 410-B.

Levers 530-A and 530-B pivot on pivots 545-A and 545-B, respectively, from a first lever position to a second lever position. In FIG. 5A, levers 530-A and 530-B are in the first lever position, in which first end 531-A and first end 531-B are positioned in a "down" position at the bottom of slot 265. When first ends 531-A, 531-B are in the "down" position, as in FIG. 5A, second end 532-A of lever 530-A and second end 532-B of lever 530-B are raised; consequently, wheels 410-A and 410-B are in a first wheel position, or "raised" position, in which the wheels are above the lower edge 281 of pad 280. In this first wheel position, no portion of wheels 410 is below edge 281, which constitutes the bottom surface of housing 215; thus wheels 410-A and 410-B do not contact surface 420.

In FIG. 5B, levers 530-A and 530-B are in the second lever position, in which first end 531-A and first end 531-B are positioned in an "up" position, at the top of slot 265. When first ends 531-A and 531-B are in the "up" position, as in FIG. 5B, second end 532-A of lever 530-A and second end 532-B of lever 530-B are lowered; consequently, wheels 410-A and 410-B are in a second wheel position, or a "lowered" position, in which at least a portion of the wheels are lower than the lower edge 281 of pad 280. Because at least a portion of wheels 410 are below edge 281, which is the bottom surface of housing 215, wheels 410-A and 410-B are in contact with surface 420.

In the illustrative embodiment, the mechanism shown in FIGS. 5A-5B is present, and functions in the manner described herein, on both sides of rollable drawer system 200. When wheels 410-A and 410-B of both sides of housing 215 are in the lowered position on both sides of housing 215, rollable drawer system 200 may roll on surface 420.

FIG. 6A shows a cross-section of rollable drawer system 200 taken at line A (shown in FIGS. 4A-4B). In the illustrative embodiment, a lower edge of each side of housing 215 is coupled to a respective flange 695. Each flange 695 extends horizontally along the underside of housing 215. Each flange 695 may be between one-fourth inch and one inch wide, for example. Other dimensions may be used. Each flange 695 may be connected to the side of housing 215 by any suitable connecting mechanism such as glue, screws, fasteners, etc. In another embodiment, the lower edge of each side of housing 215 curves inward and extends inwardly to form a flange such that the side and the flange form a single integrated piece.

A respective pad 280 is attached to each respective flange 695. Pad 280 may comprise any suitable material such as a plastic material, a foam material, a cloth material, etc. Pad 280 may be glued to flange 695, for example. In other embodiments, pad 280 may be attached to flange 695 by another type of connecting mechanism, such as by screws, nails, or other fasteners. In another embodiment, each side of housing 215 may include multiple pads.

In the illustrative embodiment of FIG. 6A, drawer 230 is supported by, and slides on, a pair of tracks 625. In other embodiments, a drawer system may be constructed differently, and the drawer may use a different mechanism to move or slide.

In other embodiments, a different type of pad system may be used. For example, FIG. 6B shows a rollable drawer system in accordance with another embodiment. Rollable drawer system 700 includes a housing 715 and drawer 230. Housing 715 includes two side walls 705. Each side wall 705 does not include a flange. A U-shaped pad 680 is attached to the lower end of each side wall 705.

Figure 7:
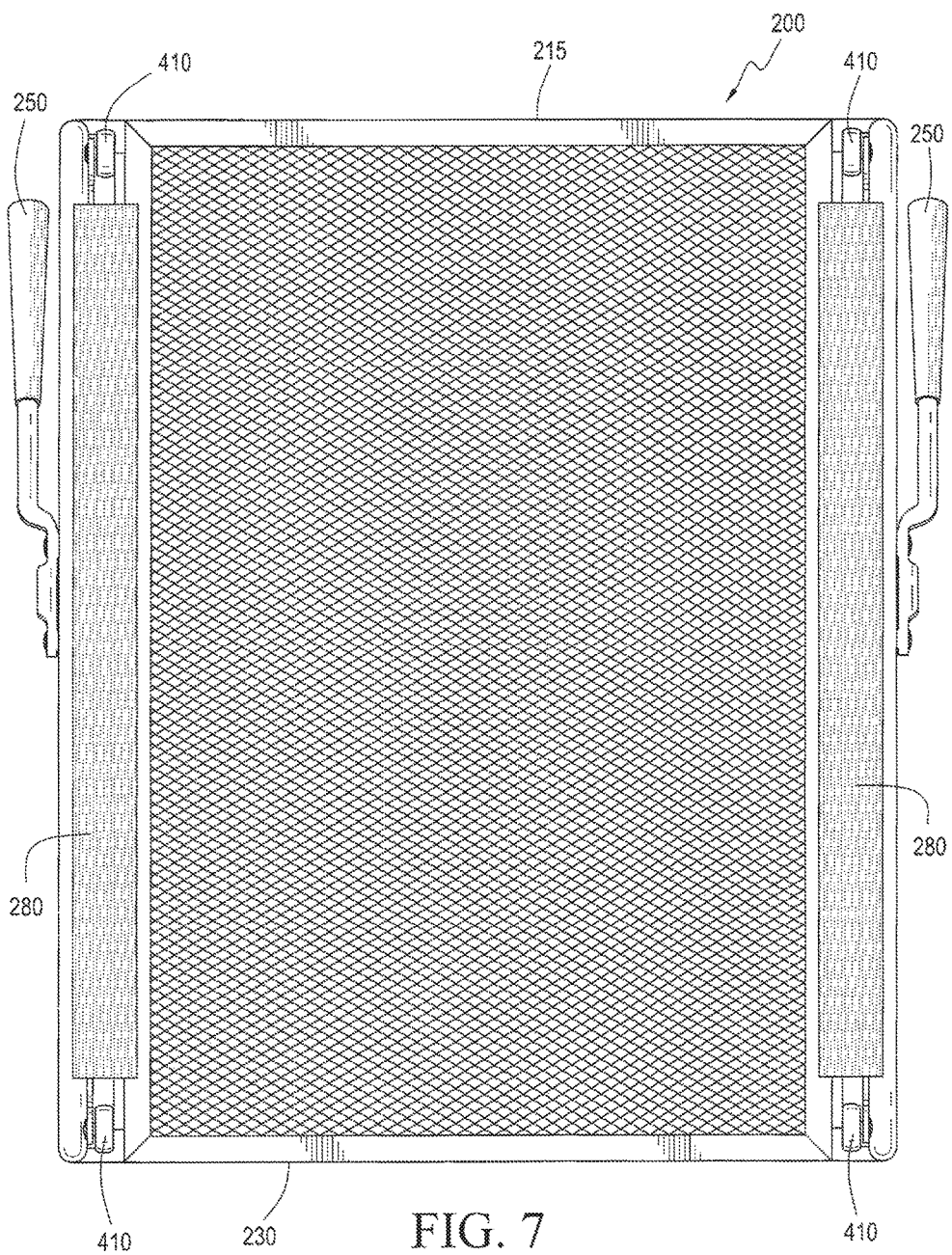
FIG. 7 shows a bottom view of a rollable drawer system in accordance with an embodiment.

FIG. 7 shows a bottom view of rollable drawer system 200. Drawer 230 is visible from the underside of rollable drawer system 200. On each side of housing 215, a pad 280, a pair of wheels 410, and an arm 250 are visible.

Figure 8:
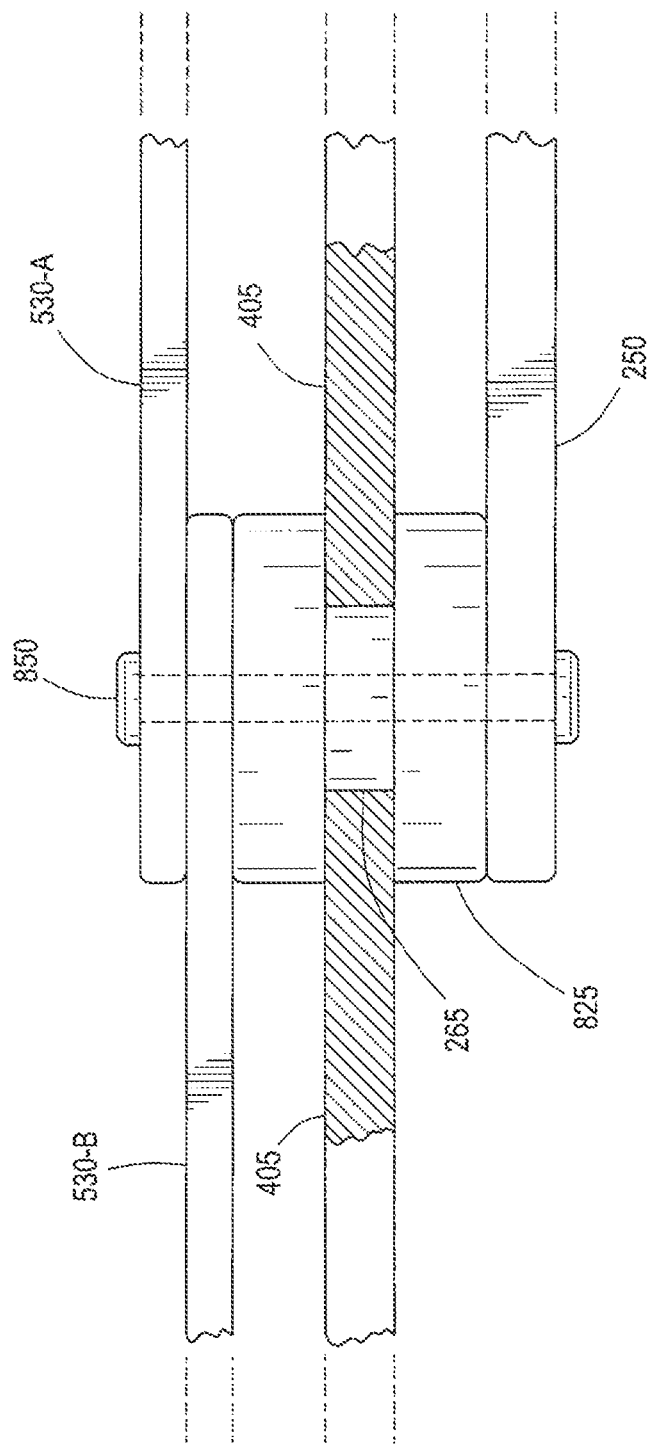
FIG. 8 shows a cross-section of a side wall of a rollable drawer system in accordance with an embodiment.

FIG. 8 shows a cross-section of a portion of the side wall 405 of rollable drawer system 200 in accordance with an embodiment. Slot 265 is defined within wall 405. A friction-generating element 825 fits in and is engaged in slot 265. Friction-generating element 825 may comprise plastic, for example, or another material. Arm 250, and levers 530-A and 530-B, are coupled to friction-generating element 825 by a fastening element 850, which may be a screw, a bolt, or another type of fastener, for example.

Friction-generating element 825 is adapted to slide up and down within slot 265. However, the friction generated between friction-generating element 825 and side wall 405 (at the edges of slot 265) is sufficient to maintain friction-generating element 825 in a selected position within slot 265. For example, when a user raises arm 250 to the "up" position within slot 265, friction-generating element 825 and levers 530 also move to the "up" position. Friction causes friction-generating element 825, arm 250, and levers 530 to remain in the "up" position.

In other embodiments, other mechanisms may be used to couple arm 250 to levers 530 via slot 265.

Figure 9A:
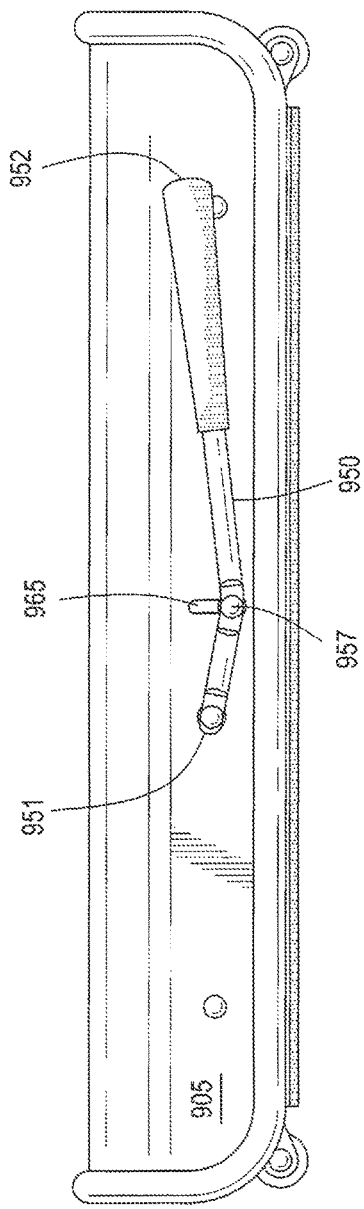
FIGS. 9A-9B show side views of a rollable drawer system in accordance with another embodiment.
Figure 9B:
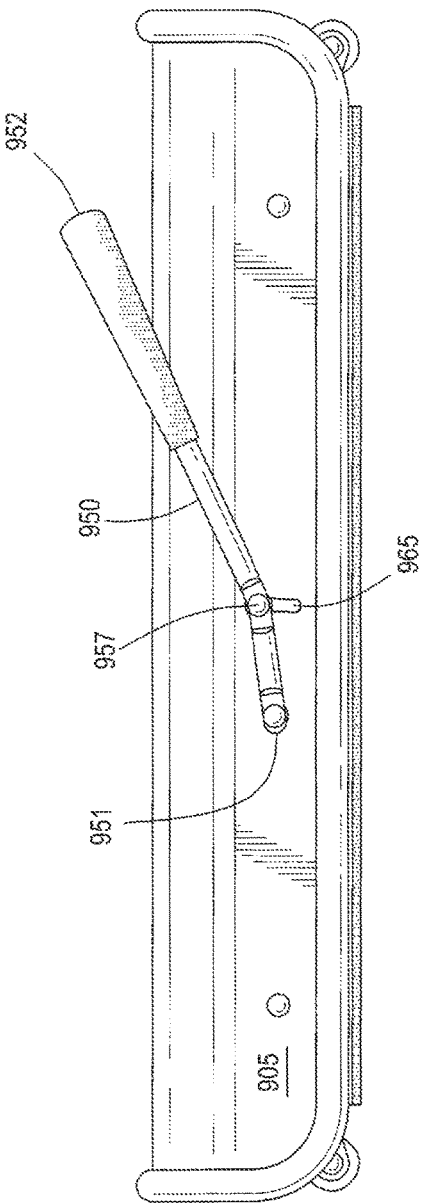

FIGS. 9A-9B show a side view of a rollable drawer system in accordance with another embodiment. In this embodiment, an arm 950 has a first end 951 fixed to a sidewall 905 and a second end 952 which may be adjusted by a user. Arm 950 also includes an element 957 (which may be a screw or bolt, for example) which is positioned in a middle portion of the arm and is engaged in a slot 965. Element 957 is adapted to move up and down within slot 965. Arm 950 has a "down" position, as shown in FIG. 9A, and an "up" position, as shown in FIG. 9B. Arm 950 may control the movements of wheels arranged on the interior side of wall 905, in a manner similar to that described above.

Figure 10A:
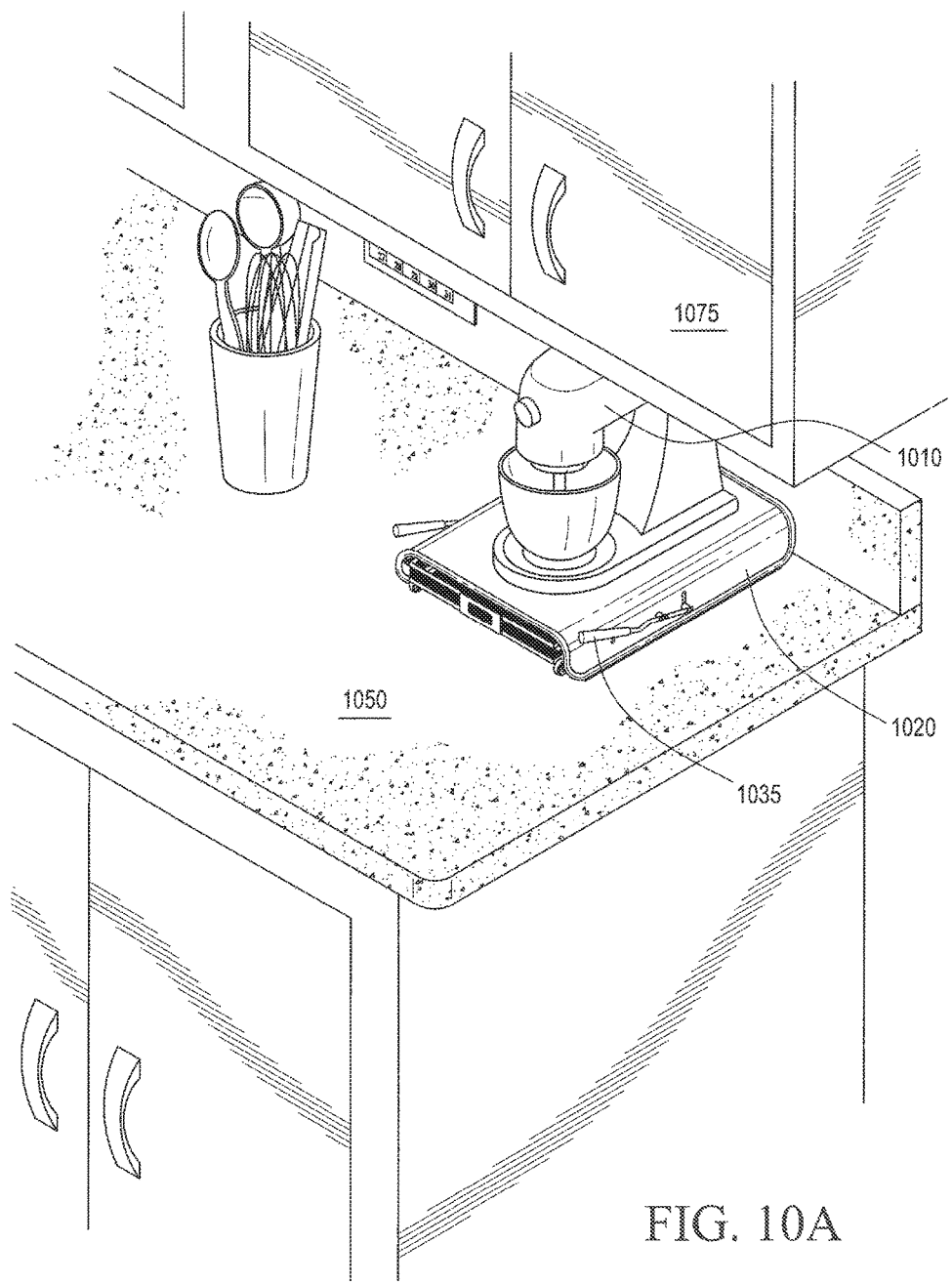
FIGS. 10A-10D show a mixing machine stacked on top of a rollable drawer system, on a countertop in a kitchen, in accordance with an embodiment.
Figure 10B:
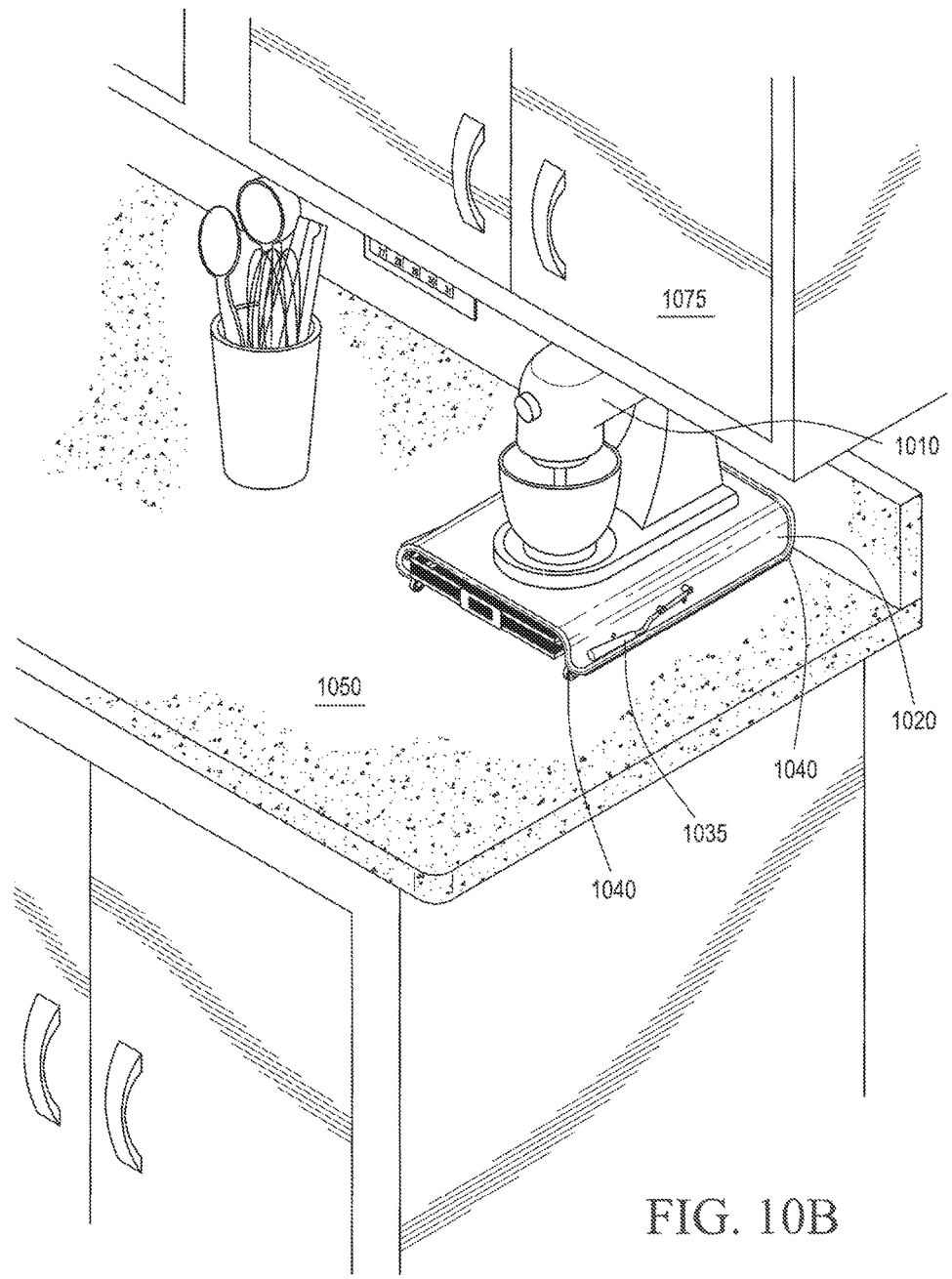
Figure 10C:
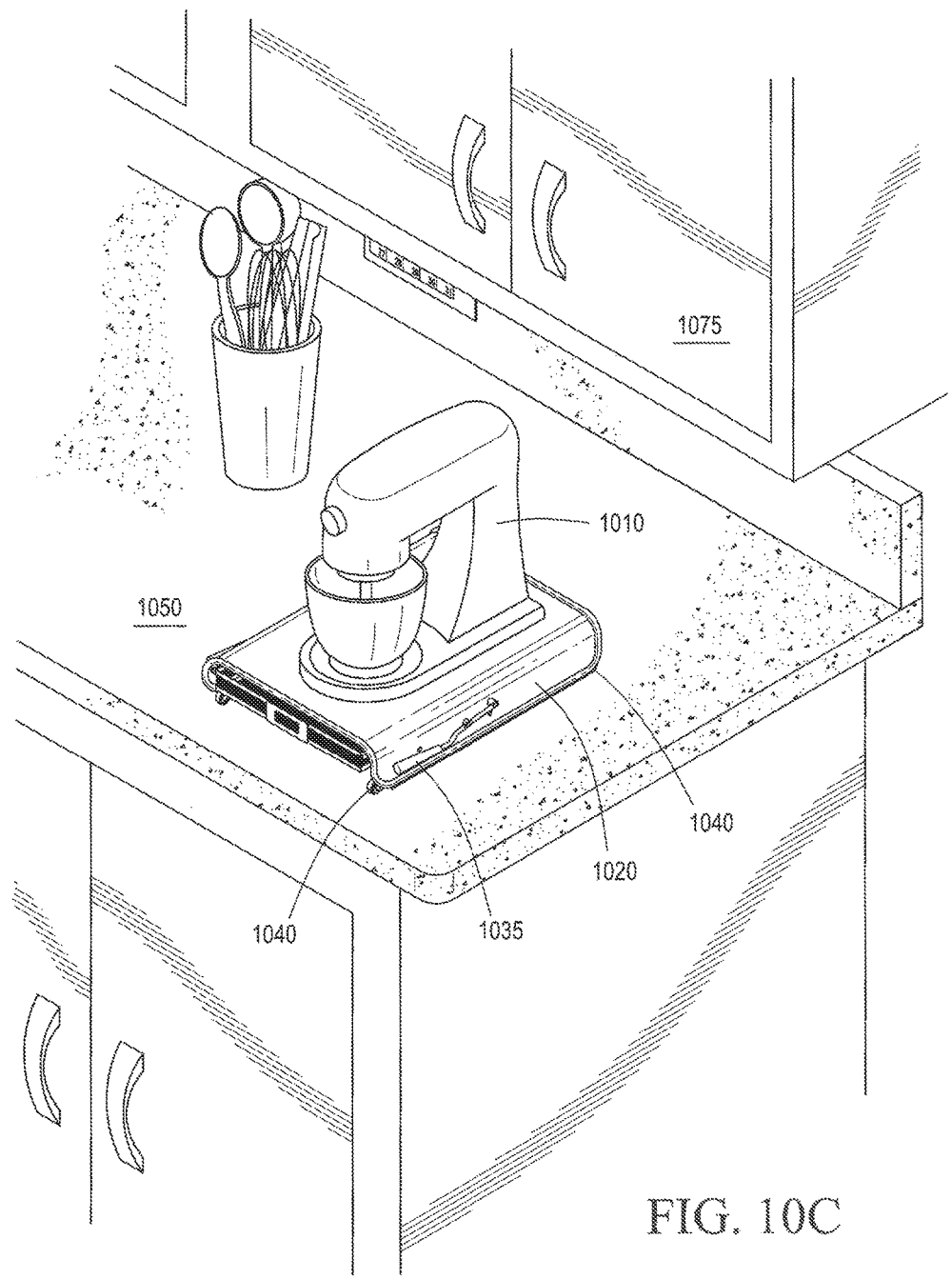
Figure 10D:
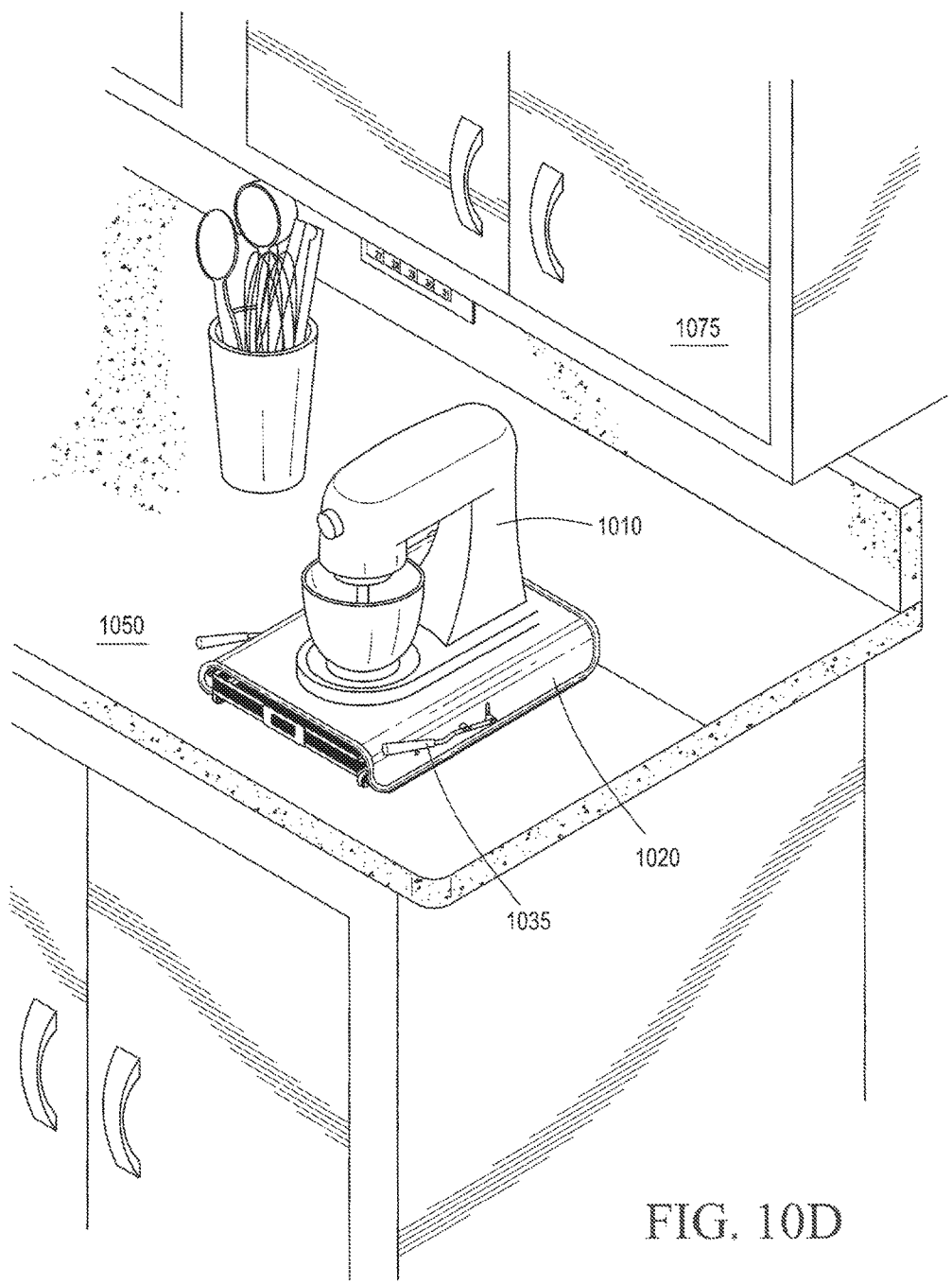
Figure 11:
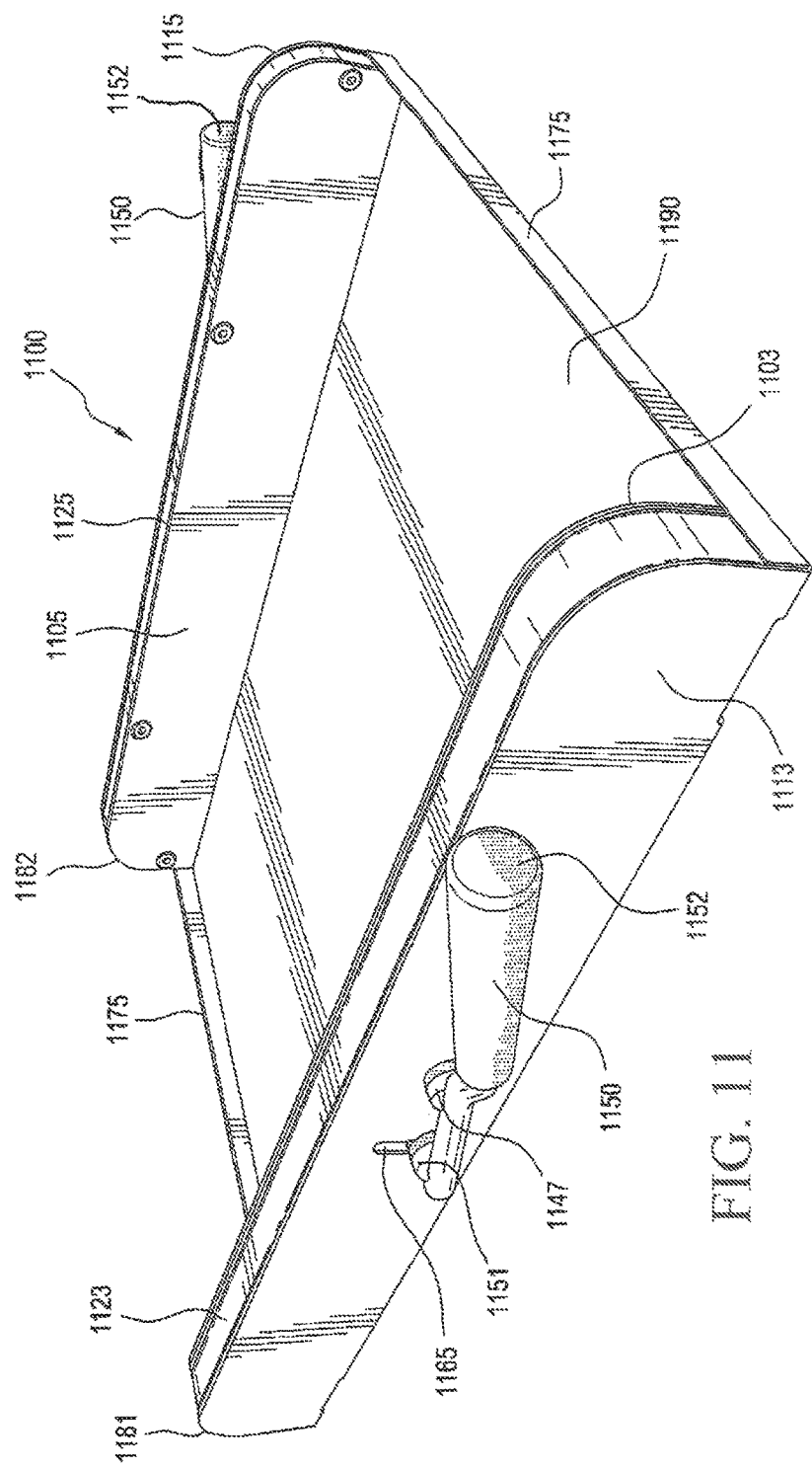
Figure 12:
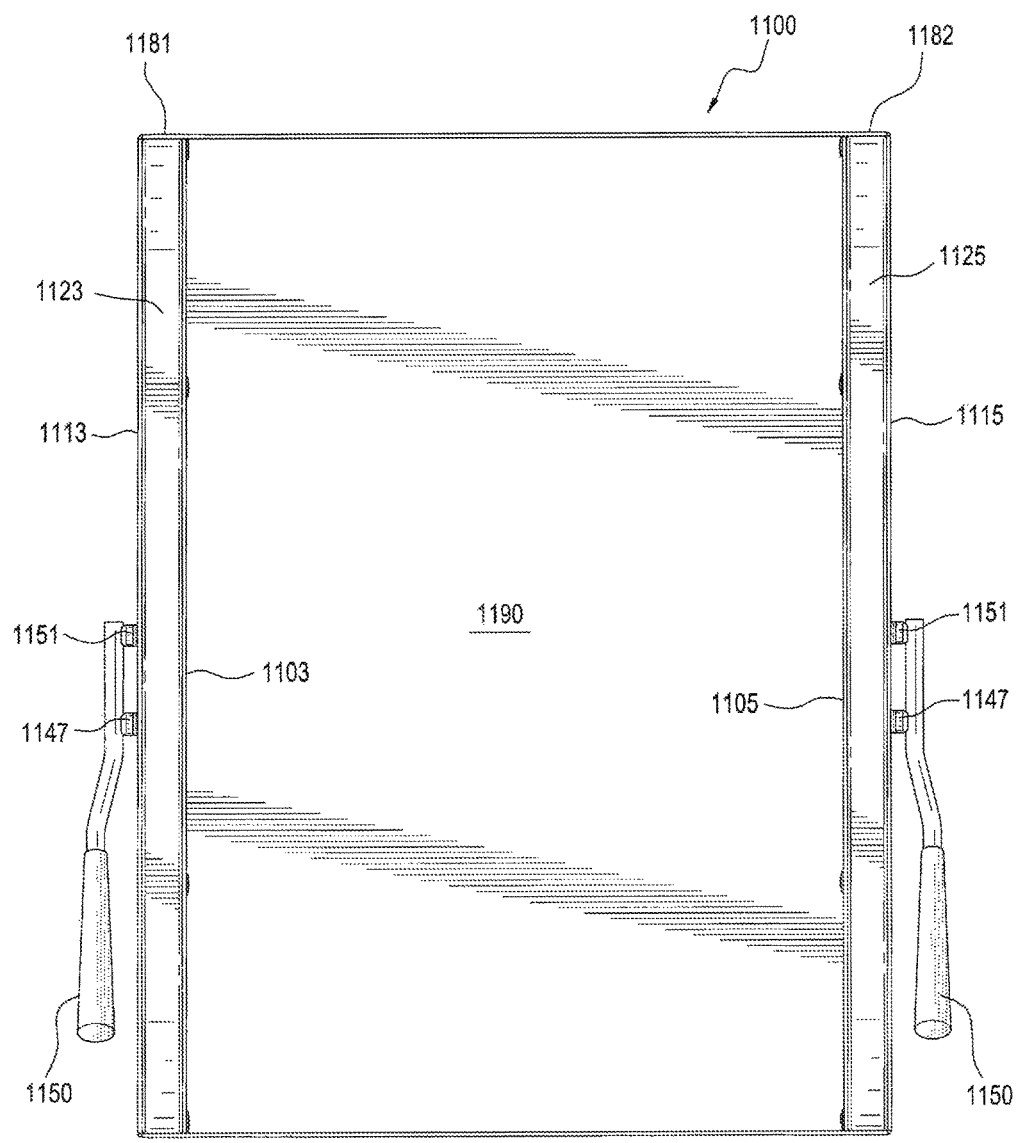
Figure 13:
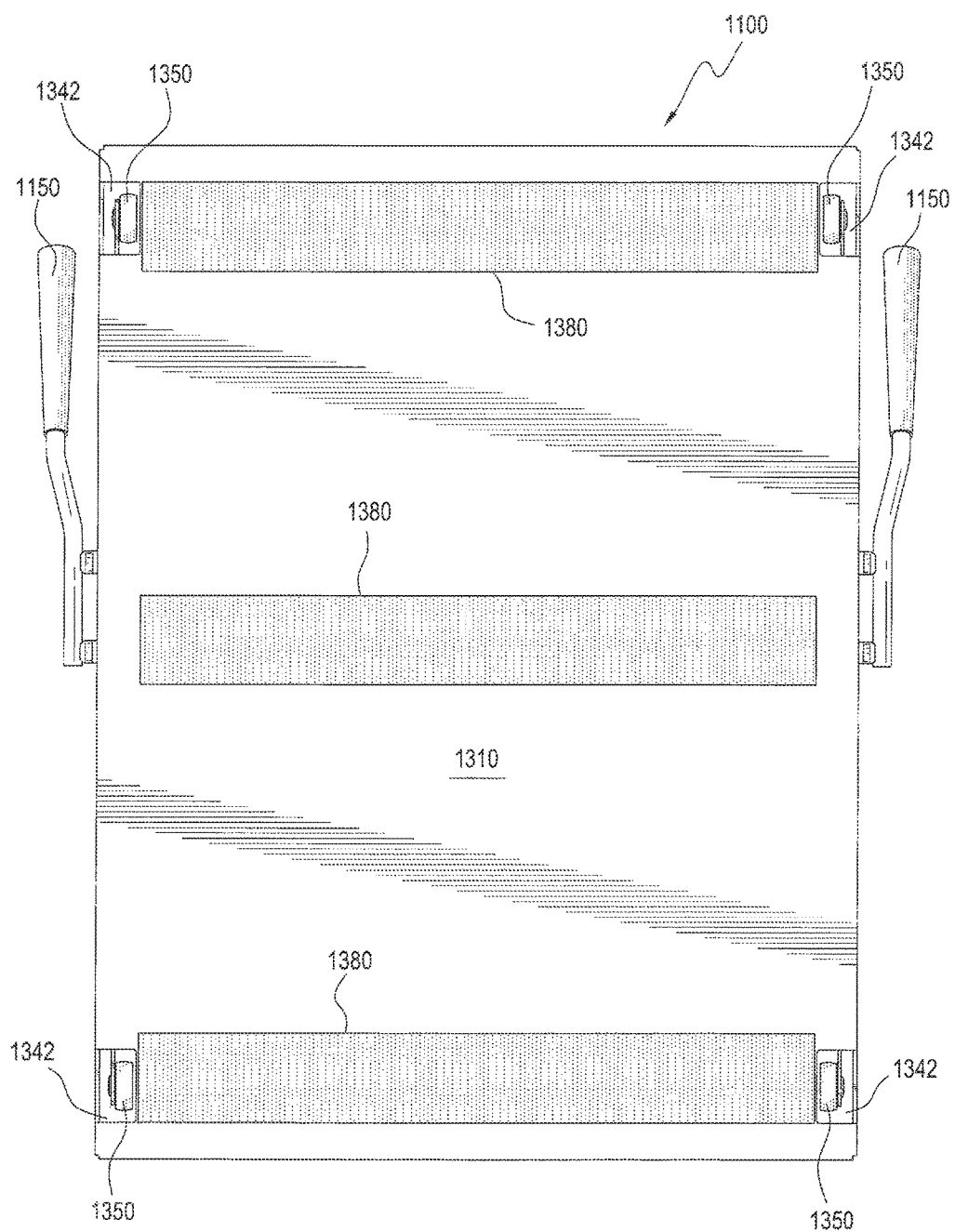
Figure 14:
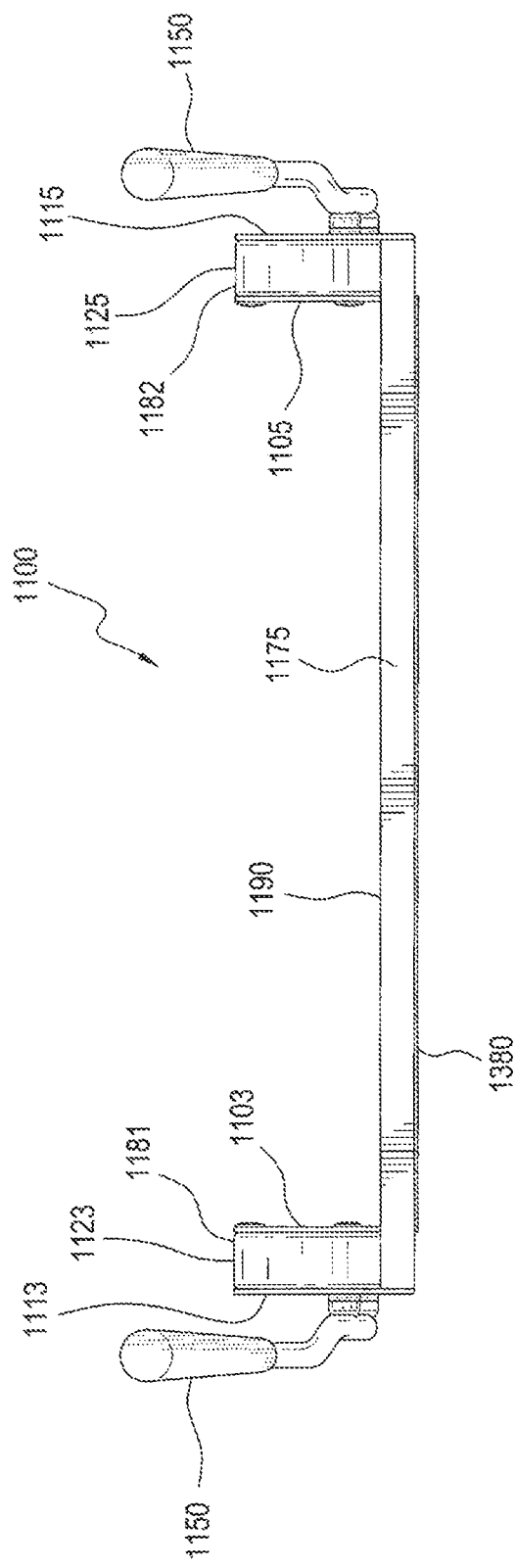
Figure 15:
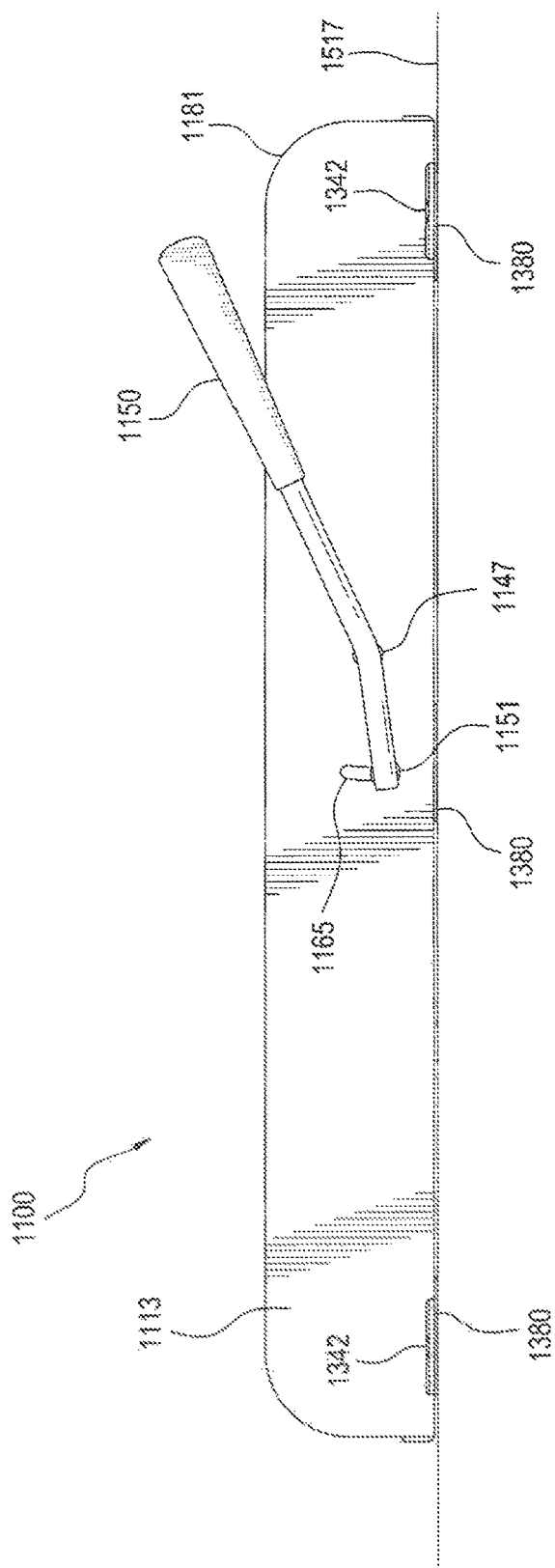
Figure 16:
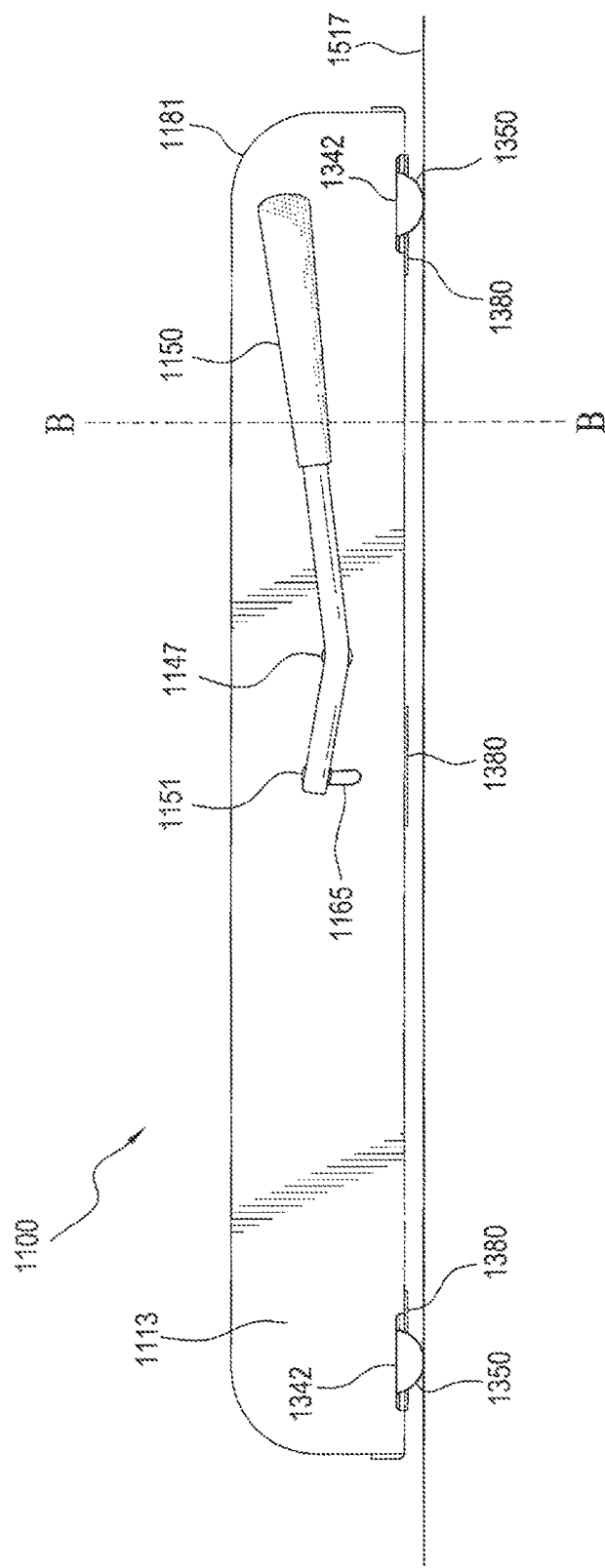
Figure 17:
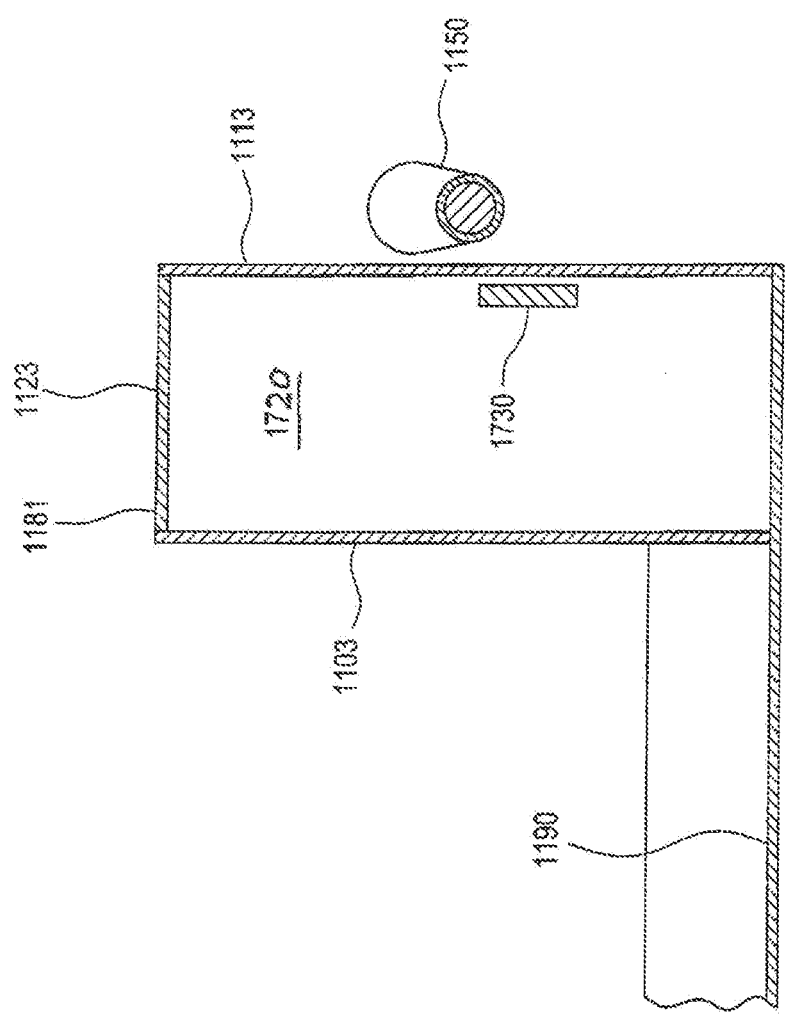
Figure 18A:
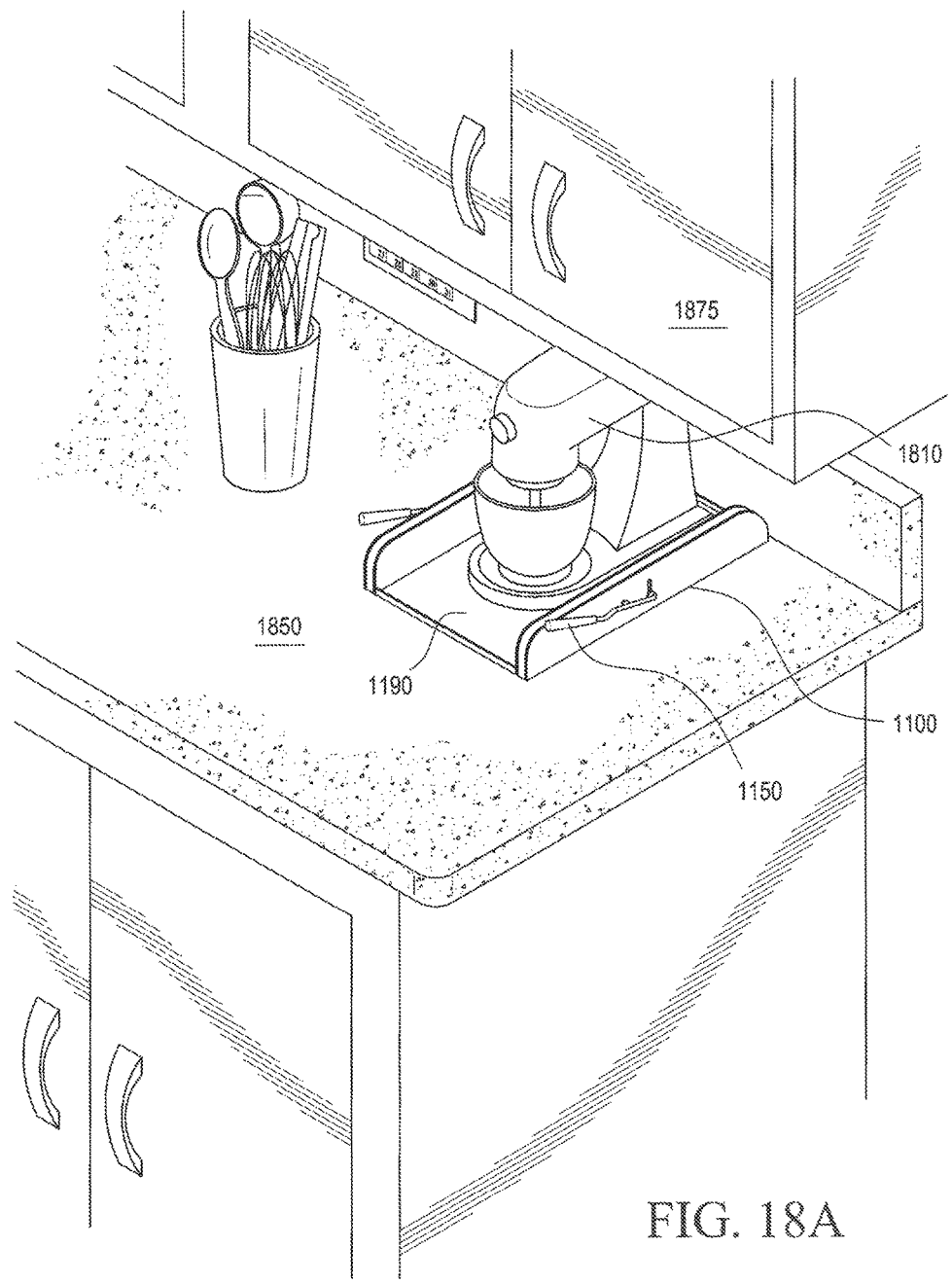
Figure 18B:
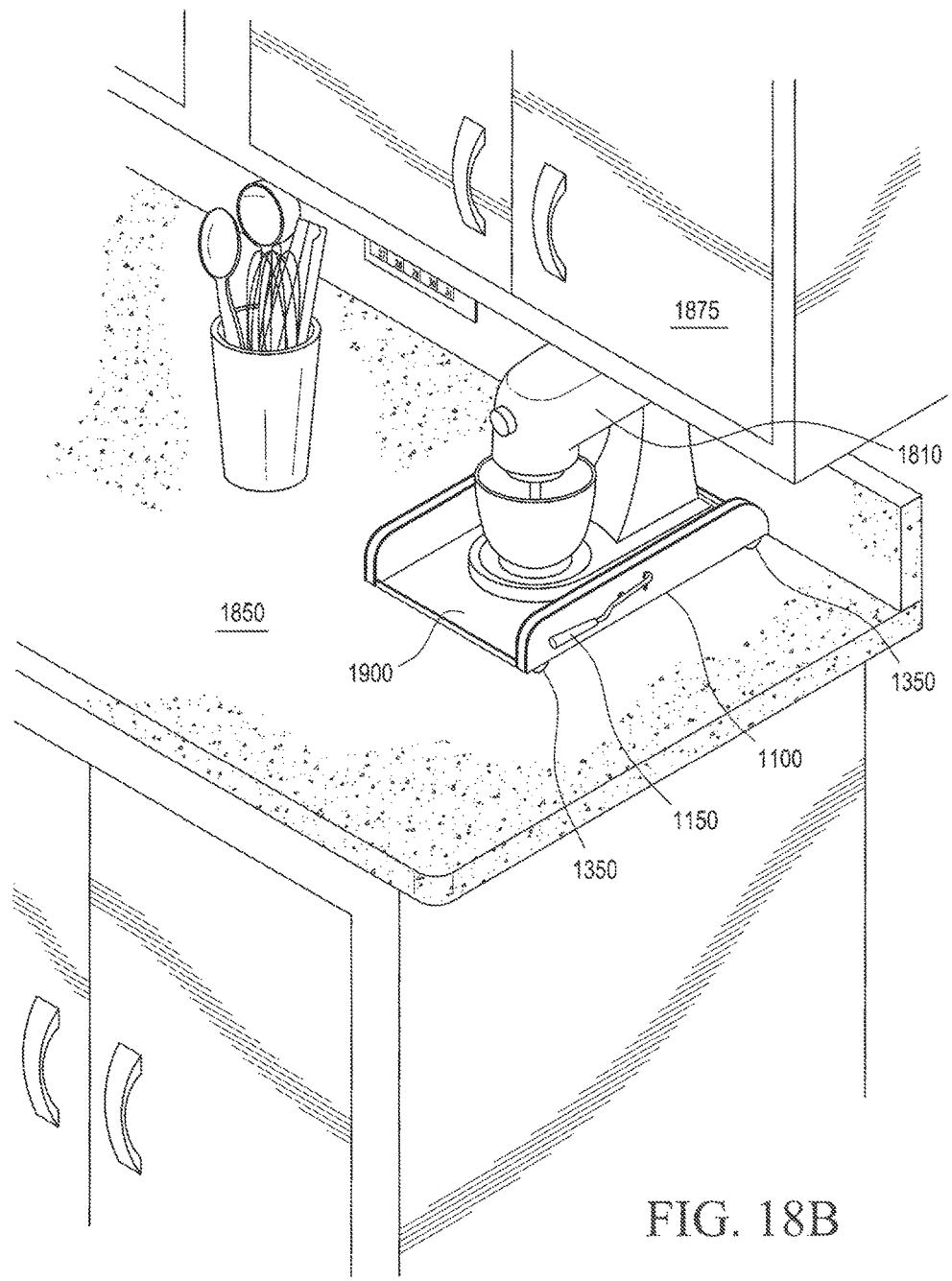
Figure 18C:
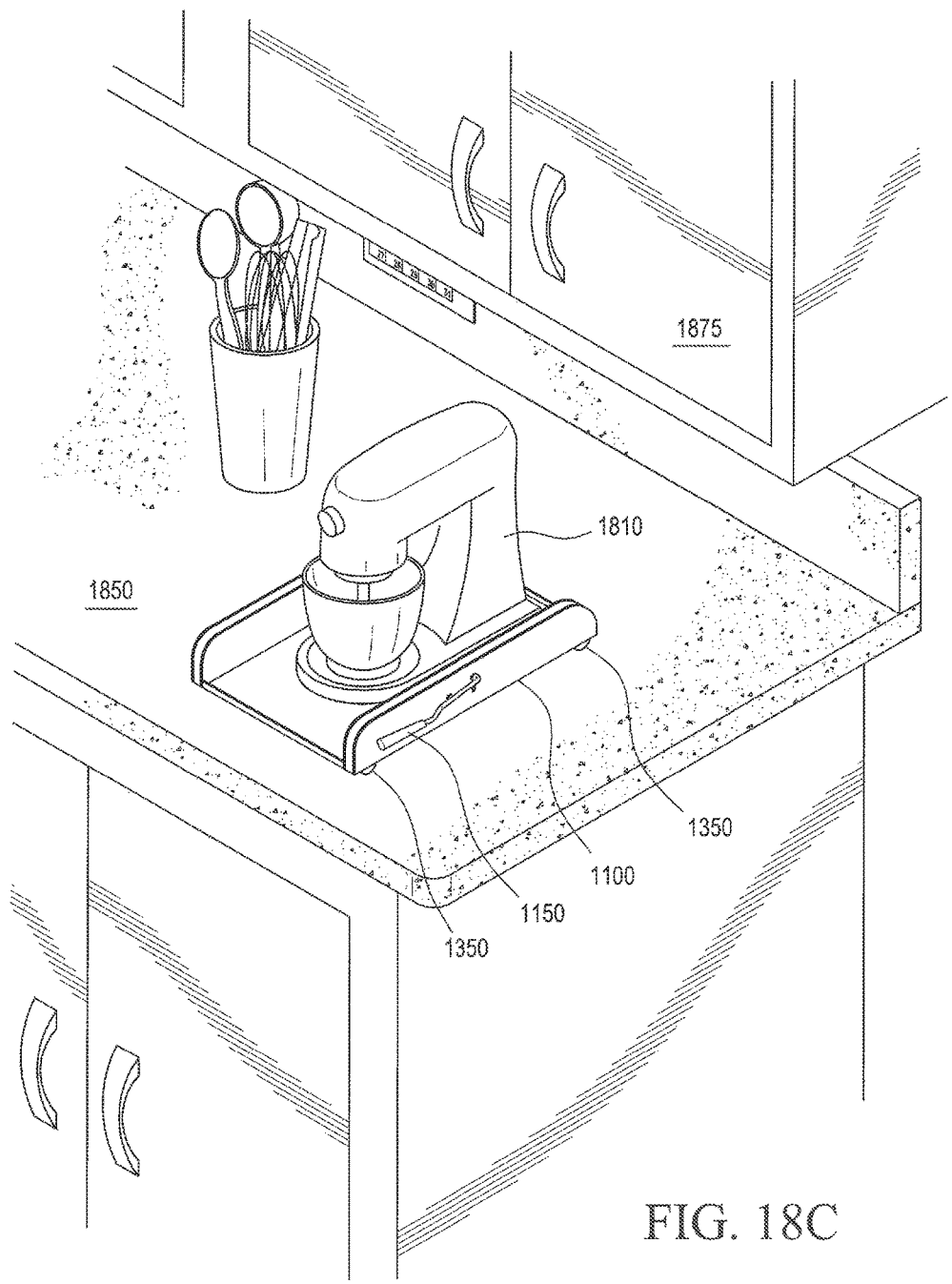
Figure 18D:
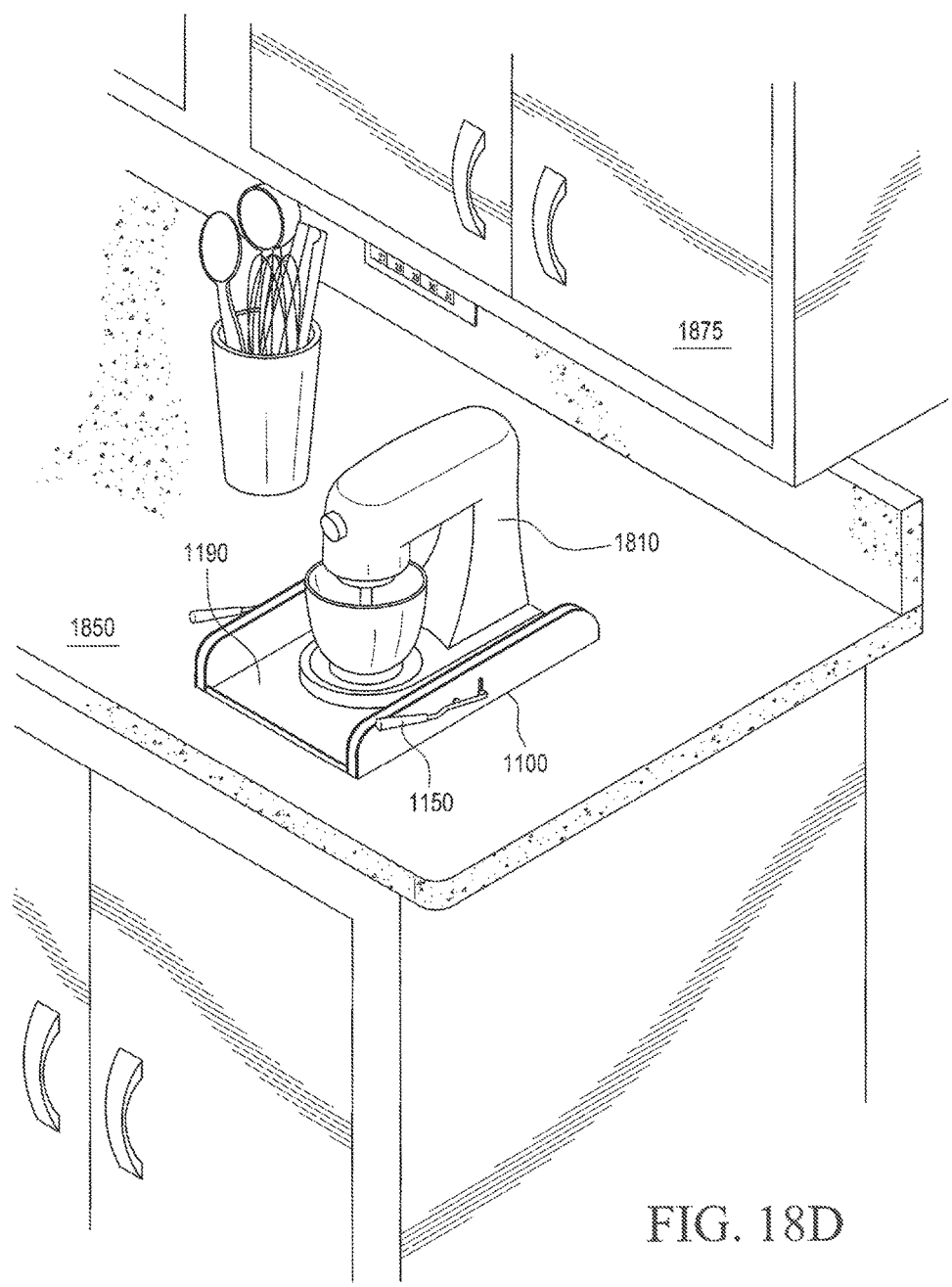

Systems, apparatus, and methods described herein advantageously have numerous uses. For example, a user may store any desired object(s) in drawer 230 and roll the drawer system 200 on a surface to a desired location for storage. In a preferred use, rollable drawer system 200 may advantageously facilitate the use of a mixing machine or food processor in a user's kitchen. Referring to FIG. 10A, a user may stack a mixing machine 1010 on top of a rollable drawer system 1020, and store the stacked appliances on a countertop 1050, under a cabinet 1075. When the user wishes to use the mixing machine 1010, the user may adjust an arm 1035 of the rollable drawer system 1020 from a first arm position to a second arm position in order to lower the drawer system's wheels 1040, as shown in FIG. 10B. The user may then roll the drawer system 1020, with the mixing machine 1010 sitting on top thereof, out from under the cabinet 1075, as shown in FIG. 10C. With the rollable drawer system 1020 and the mixing machine 1010 out from under the cabinet 1075, the user may then adjust the arm 1035 to the first arm position in order to retract (raise) the wheels, causing the rollable drawer system 1020 to rest securely on the countertop 1050, as shown in FIG. 10D. The user may now easily raise an upper portion of the mixing machine 1010 without obstruction, install a desired tool, and use the mixing machine 1010.

It is known that mixing machines are heavy and unwieldy and therefore can be difficult to move around manually in a kitchen. It is also known that mixing machines generate a significant amount of energy and vibration when in use. Advantageously, a rollable drawer system such as rollable drawer system 1020 allows a user to roll the drawer system and the mixing machine 1010 across the countertop as desired. Also, drawer system 1020 advantageously allows the user to retract the drawer system's wheels to secure the drawer system 1020 on the countertop surface while the mixing machine 1010 is being used, thereby preventing the drawer system 1020 from slipping or moving on the countertop due to the vibrations caused by the mixing machine 1010.

After using the mixing machine 1010, the user may again lower the wheels 1040, roll the drawer system 1020 and mixing machine 1010 back to their original location under the cabinet 1075, and retract the wheels 1040 to the raised position. The drawer system 1020 and mixing machine 1010 may in this manner be returned to their original location for storage until the next time the user wishes to use the mixing machine 1010.

While systems, apparatus, and methods disclosed herein are described in certain illustrative embodiments in connection with the use of a mixing machine, the systems, apparatus, and methods described herein may also be advantageously used in connection with the use of other types of devices including, without limitation, food processors.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus comprising:
a housing having first and second sides, a bottom surface, and an opening between the first and second sides; and
a drawer disposed in the housing between the first and second sides, the drawer being adapted to slide between a first drawer position and a second drawer position through the opening;
wherein each of the first and second sides of the housing comprises:
a side wall having an interior side proximate the drawer and an exterior side opposite the interior side;
first and second wheels coupled to the housing and disposed on the interior side of the side wall, the first and second wheels having a first wheel position in which no portion of the first and second wheels is below the bottom surface of the housing and a second wheel position in which a portion of each of the first and second wheels is below the bottom surface of the housing;
a slot defined in the side wall, wherein the slot is located between a first point on the side wall where the first wheel is disposed and a second point on the side wall where the second wheel is disposed;
an arm pivot disposed in the side wall, wherein the arm pivot is located between the slot and the first point on the side wall;
an arm coupled to the housing and disposed on the exterior side of the side wall, the arm having a first arm end and a second arm end, the first arm end being engaged in the slot, the second arm end being adapted for manipulation by a user, the arm being fixed on the arm pivot at a third point between the first arm end and the second arm end, wherein movement of the second arm end causes the arm to rotate about the arm pivot, thereby causing the first arm end to move within the slot between a first slot location and a second slot location, the arm having a first arm position associated with the first slot location and a second arm position associated with the second slot location; and
first and second levers coupled to the housing and located on the interior side of the side wall, wherein the first lever has a first lever end coupled to the arm via the slot and a second lever end coupled to the first wheel, the first lever being fixed to the side wall via a first lever pivot, wherein the second lever has a first lever end coupled to the arm via the slot and a second lever end coupled to the second wheel, the second lever being fixed to the side wall via a second lever pivot;
wherein movement of the arm from the first arm position to the second arm position causes the arm to pivot about the arm pivot, thereby causing the first arm end to move within the slot from the first slot location to the second slot location, thereby causing the first and second levers to move from the first lever position to the second lever position, thereby causing the first and second wheels to move from the first wheel position to the second wheel position.

2. The apparatus of claim 1, wherein the first lever and the second lever are coupled to the arm by a friction-generating element that is engaged in the slot.

3. The apparatus of claim 1, wherein each of the first and second sides of the housing further comprises:
a pad coupled to the side wall;
wherein an edge of the pad defines the bottom surface of the housing.

4. The apparatus of claim 3, wherein each of the first and second sides further comprises:
a flange attached to the side wall;
wherein the pad is attached to the flange.

5. The apparatus of claim 4, wherein the pad comprises one of a plastic material, a foam material, and a cloth material.

6. A rollable drawer system comprising:
a housing comprising:
a top;
first and second sides, each side comprising:
a wall having an interior, an exterior, and a lower edge;
a pair of wheels coupled to the wall on the interior of the wall, the pair of wheels having a first wheel position in which the pair of wheels are higher than the lower edge of the wall, and a second wheel position in which the pair of wheels are lower than the lower edge of the wall;
a slot defined in the wall, wherein the slot is located between a first point on the wall where a first one of the pair of wheels is coupled to the wall and a second point on the wall where a second one of the pair of wheels is coupled to the wall;
an arm pivot disposed in the wall, wherein the arm pivot is located between the slot and the first point on the wall;
an arm coupled to the wall on the exterior of the wall, the arm having a first arm end and a second arm end, the first arm end being engaged in the slot, the second arm end being adapted for manipulation by a user, the arm being fixed on the arm pivot at a third point between the first arm end and the second arm end, wherein movement of the second arm end causes the arm to rotate about the arm pivot, thereby causing the first arm end to move within the slot between a first slot location and a second slot location, the arm having a first arm position associated with the first slot location and a second arm position associated with the second slot location; and
first and second levers located on the interior of the wall, wherein the first lever has a first lever end coupled to the arm via the slot and a second lever end coupled to the first one of the pair of wheels, the first lever being fixed to the wall via a first lever pivot, wherein the second lever has a first lever end coupled to the arm via the slot and a second lever end coupled to the second one of the pair of wheels, the second lever being fixed to the wall via a second lever pivot;
wherein a movement of the arm from the first arm position to the second arm position causes the arm to pivot about the arm pivot, thereby causing the first arm end to move within the slot from the first slot location to the second slot location, thereby causing the first and second levers to move from the first lever position to the second lever position, thereby causing the pair of wheels to move from the first wheel position to the second wheel position;
wherein the first and second sides define an opening; and
a drawer disposed in the housing, the drawer being adapted to move through the opening of the housing, the drawer having a closed position in which the drawer is fully in the housing and an open position in which the drawer is removed at least partially from the housing through the opening;
wherein the rollable drawer system cannot roll on a surface when the pair of wheels coupled to the first side are in the first wheel position and the pair of wheels coupled to the second side are in the first wheel position;
wherein the rollable drawer system is adapted to roll on the surface when the pair of wheels coupled to the first side are in the second wheel position and the pair of wheels coupled to the second side are in the second wheel position.

7. The rollable drawer system of claim 6, wherein each side further comprises:
a friction-generating element engaged in the slot;
wherein:
the first and second levers are coupled to the friction-generating element; and
the arm is coupled to the friction-generating element.

8. The rollable drawer system of claim 6, wherein each side of the housing further comprises:
a pad having a lower surface;
wherein the respective pair of wheels is above the lower surface of the pad when the pair of wheels are in the first wheel position and the pair of wheels are below the lower surface of the pad when the pair of wheels are in the second wheel position.

9. The rollable drawer system of claim 8, wherein the pad comprises one of a plastic material, a foam material, and a cloth material.

10. A rollable drawer system comprising:
a housing comprising:
a top;
first and second sides, each side comprising:
a wall having an interior, an exterior, and a lower edge;
a pair of wheels coupled to the wall on the interior of the wall, the pair of wheels having a first wheel position in which the pair of wheels are higher than the lower edge of the wall, and a second wheel position in which the pair of wheels are lower than the lower edge of the wall;
a slot defined in the wall, wherein the slot is located between a first point on the wall where a first one of the pair of wheels is coupled to the wall and a second point on the wall where a second one of the pair of wheels is coupled to the wall;
an arm pivot disposed in the wall, wherein the arm pivot is located between the slot and the first point on the wall;
an arm coupled to the wall on the exterior of the wall, the arm having a first arm end and a second arm end, the first arm end being fixed on the arm pivot, the second arm end being adapted for manipulation by a user, the arm being engaged in the slot at a third point between the first arm end and the second arm end, wherein movement of the second arm end causes the arm to rotate about the arm pivot, thereby causing the arm to move within the slot between a first slot location and a second slot location, the arm having a first arm position associated with the first slot location and a second arm position associated with the second slot location; and first and second levers located on the interior of the wall, wherein the first lever has a first lever end coupled to the arm via the slot and a second lever end coupled to the first one of the pair of wheels, the first lever being fixed to the wall via a first lever pivot, wherein the second lever has a first lever end coupled to the arm via the slot and a second lever end coupled to the second one of the pair of wheels, the second lever being fixed to the wall via a second lever pivot;

wherein a movement of the arm from the first arm position to the second arm position causes the arm to pivot about the arm pivot, thereby causing the first arm end to move within the slot from the first slot location to the second slot location, thereby causing the first and second levers to move from the first lever position to the second lever position, thereby causing the pair of wheels to move from the first wheel position to the second wheel position;

wherein the first and second sides define an opening; and a drawer disposed in the housing, the drawer being adapted to move through the opening of the housing, the drawer having a closed position in which the drawer is fully in the housing and an open position in which the drawer is removed at least partially from the housing through the opening;

wherein the rollable drawer system cannot roll on a surface when the pair of wheels coupled to the first side are in the first wheel position and the pair of wheels coupled to the second side are in the first wheel position;

wherein the rollable drawer system is adapted to roll on the surface when the pair of wheels coupled to the first side are in the second wheel position and the pair of wheels coupled to the second side are in the second wheel position.

11. The rollable drawer system of claim 10, wherein each side further comprises:

a friction-generating element engaged in the slot;

wherein:

the first and second levers are coupled to the friction-generating element; and the arm is coupled to the friction-generating element.

12. The rollable drawer system of claim 10, wherein each side of the housing further comprises:

a pad having a lower surface;

wherein the respective pair of wheels is above the lower surface of the pad when the pair of wheels are in the first wheel position and the pair of wheels are below the lower surface of the pad when the pair of wheels are in the second wheel position.

13. The rollable drawer system of claim 12, wherein the pad comprises one of a plastic material, a foam material, and a cloth material.

* * * * *